(12) United States Patent
Katoh et al.

(10) Patent No.: US 7,364,776 B2
(45) Date of Patent: Apr. 29, 2008

(54) DISPLAY DEVICE

(75) Inventors: Takashi Katoh, Minami-ashigara (JP); Koji Takaku, Minami-ashigara (JP); Naoyuki Hayashi, Minami-ashigara (JP)

(73) Assignee: Fujifilm Corporation, Tokyo (JP)

( * ) Notice: Subject to any disclaimer, the term of this patent is extended or adjusted under 35 U.S.C. 154(b) by 21 days.

(21) Appl. No.: 11/452,316

(22) Filed: Jun. 14, 2006

(65) Prior Publication Data

US 2007/0003735 A1 Jan. 4, 2007

(30) Foreign Application Priority Data

Jun. 16, 2005 (JP) ............................ 2005-176242
Dec. 16, 2005 (JP) ............................ 2005-363563

(51) Int. Cl.
*C09K 19/60* (2006.01)
*C09K 19/52* (2006.01)
*C09K 19/54* (2006.01)

(52) U.S. Cl. ............... 428/1.3; 252/299.01; 252/299.1; 252/299.5

(58) Field of Classification Search ................. 428/1.1, 428/1.3; 252/299.01, 299.1, 299.5
See application file for complete search history.

(56) References Cited

U.S. PATENT DOCUMENTS

| 5,223,959 | A | * | 6/1993 | Wu et al. | ...................... 349/36 |
| 5,523,114 | A | * | 6/1996 | Tong et al. | .................... 427/68 |
| 5,688,328 | A | * | 11/1997 | Tong et al. | ................. 118/505 |
| 7,220,466 | B2 | * | 5/2007 | Katoh et al. | .................. 428/1.1 |
| 2003/0214624 | A1 | * | 11/2003 | Fujii et al. | ..................... 349/158 |
| 2006/0054860 | A1 | * | 3/2006 | Katoh et al. | ............. 252/299.1 |
| 2006/0060822 | A1 | * | 3/2006 | Takaku et al. | ......... 252/299.01 |
| 2006/0263543 | A1 | * | 11/2006 | Takaku et al. | ............... 428/1.1 |

OTHER PUBLICATIONS

English abstract for JP 56048615, 1981.*

* cited by examiner

*Primary Examiner*—Shean C Wu
(74) *Attorney, Agent, or Firm*—Birch, Stewart, Kolasch & Birch, LLP

(57) ABSTRACT

A novel display device is disclosed. The display device comprises a plural of liquid crystal layers disposed between a pair of electrodes respectively, wherein each of the liquid crystal layers shows an absorption peak at a different wavelength and comprises at least one dichroic dye and at least one dual-frequency switchable liquid crystal as a host liquid crystal.

15 Claims, 4 Drawing Sheets

DISPLAY DEVICE

This application claims benefit of priorities under 35 U.S.C. 119 to Japanese Patent Application Nos. 2005-176242 filed Jun. 16, 2005 and 2005-363563 filed Dec. 16, 2005.

BACKGROUND OF THE INVENTION

1. Field of the Invention

The present invention related to a display device, especially, to a color liquid crystal display device employing a guest-host (GH) mode.

2. Related Art

With dissemination of digital information, importance of a display for displaying digital information (hereinafter referred to as "electronic paper") has been growing. Electronic papers are required to have a high level of visibility and a low consumption of electric power. A high level of visibility means a white background close to paper, and, for this purpose, there is preferred a manner based on a scattering white background similar to that in case of paper. Also a reflective displaying manner is advantageous from view of lower consumption of electric power, in comparison with a self-light-emitting display manner. Various manners have been proposed for the electronic paper, such as a reflective liquid crystal displaying, an electrophoretic displaying, a magnetophoretic displaying, a dichroic gyrating ball, an electrochromic displaying and a leucothermal displaying manners. However, none of these manners gives a high level of visibility as required, and an improvement has been desired.

Various types of liquid crystal device (liquid crystal display device) have already been proposed, among which a liquid crystal device employing GH mode is capable of highlight display and is expected as a reflective display. The liquid crystal device employing a GH mode usually comprises a cell filled with a liquid crystal composition, prepared by dissolving a dichroic dye in a nematic liquid crystal, and when a voltage is applied to the cell sufficient to rotate the liquid crystal molecules, the dye molecules rotate along with the liquid crystal molecules and allow changing of light absorption by the cell to thereby effect display. Such a liquid crystal device employing a GH mode, can display images without polarizing plates, is expected as a brighter display in comparison with the prior liquid crystal displays comprising polarizing plates.

As one example of a color liquid crystal display employing a GH mode, a display device comprising three liquid crystal layers is disclosed in JPA No. hei 11-265157 (the term "JPA" as used herein means an "unexamined published Japanese patent application (Kohkai Tokkyo Kohou)"). Each of the three layers, comprising liquid crystal microcapsules and showing an absorption peak at a different wavelength, is individually driven by thin-film transistors with an active matrix system. According to JPA No. hei 11-265157, each of the three layers is individually driven electrically, and, thus, it is necessary to form through-holes. And such a display device suffers from its complicated device configuration, from its complicated production process and from it's high cost.

A liquid crystal optical modulation element comprising a plural of liquid crystal layers is disclosed in JPA No. 2001-33805. Each of the layers, comprising a different liquid crystal composition, modulates light at a specified wavelength. According to JPA No. 2001-33805, the element, employing a simple matrix configuration, is driven with a passive matrix system. And, according to such a system, the contrast of images, especially large size images, is lowered due to crosstalk.

An element employing a GH liquid crystal layer comprising a yellow domain, a magenta domain and a cyan domain, which are disposed in parallel on a substrate, is disclosed in JPA No. hei 9-244070, especially in Example 7 and FIG. 12. Such an element suffers from a low color concentration in a black state or in each color (yellow, magenta, cyan, red, green or blue) state.

And, thus, it is required to develop a multi-color or full-color display device, having a simple configuration, capable of displaying bright images.

SUMMARY OF THE INVENTION

Accordingly, an object of the present invention is to provide a display device, employing a simple configuration, excellent in color displaying performance with a low cost.

For developing a reflective color display device employing a GH mode, a technique which can drive multiple colored-layers individually is important. Accordingly, the present inventors conducted various studies, and as a result, they found that a color display device, having a simple configuration, in particular, comprising a plural of cells, each of which comprises a pair of electrodes and a liquid crystal layer disposed therebetween formed of a liquid crystal composition comprising a dichroic dye and host liquid crystal showing a dual-frequency switchable property, exhibits a high color-displaying quality and can be produced with a low cost. On the basis of this finding, the present invention was achieved.

In one aspect, the present invention provides a display device comprising a plural of liquid crystal layers disposed between a pair of electrodes respectively, wherein each of the liquid crystal layers shows an absorption peak at a different wavelength and comprises at least one dichroic dye and at least one dual-frequency switchable liquid crystal as host liquid crystal.

The dual-frequency switchable liquid crystal may be selected from nematic liquid crystals.

The dichroic dye may be selected from the group represented by a formula (1):

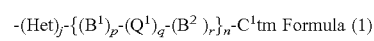

-(Het)$_j$-{(B$^1$)$_p$-(Q$^1$)$_q$-(B$^2$)$_r$}$_n$-C$^1$tm  Formula (1)

where Het represents an oxygen atom or a sulfur atom; B$^1$ and B$^2$ respectively represent a substituted or non-substituted arylene group, heteroarylene group or divalent cyclic aliphatic hydrocarbon group; Q$^1$ represents a divalent linking group; C$^1$ represents a substituted or non-substituted alkyl group, cycloalkyl group, alkoxy group, alkoxycarbonyl group, acyl group or acyloxy group; j represents 0 or 1, p, q and r respectively represent an integer from 0 to 5; and n represents an integer from 1 to 3, provided that a total number of groups represented by B$^1$ and B$^2$ in the formula (1) is from 3 to 10; in case any of p, q and r is equal to or larger than 2, B$^1$, Q$^1$ or B$^2$ present in two or more units may be same or different to each other; and, in case n is equal to or larger than 2, {(B$^1$)$_p$-(Q$^1$)$_q$-(B$^2$)$_r$} present in two or more units may be same or different to each other.

And the dichroic dye may be selected from the group represented by a formula (2) or (3):

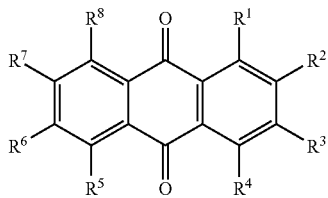

Formula (2)

where $R^1$ represents a substituent represented by $—S-\{(B^1)_p-(Q^1)_q-(B^2)_r\}_n-C^1$, in which S represents a sulfur atom, and $B^1$, $B^2$, $Q^1$, p, q, r and n have respectively same definitions as in the formula (1); and $R^2$, $R^3$, $R^4$, $R^5$, $R^6$, $R^7$ and $R^8$ respectively represent a hydrogen atom or a substituent;

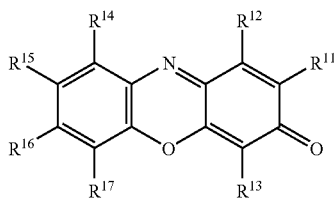

Formula (3)

where $R^{11}$, $R^{12}$, $R^{13}$, $R^{14}$, $R^{15}$, $R^{16}$, and $R^{17}$ respectively represent a hydrogen atom or a substituent, provided that at least one represents a substituent represented by $—S-\{(B^1)_p-(Q^1)_q-(B^2)_r\}n-C^1$, in which S represents a sulfur atom, and $B^1$, $B^2$, Q, p, q, r and n have respectively same definitions as in the formula (1).

As one embodiment of the present invention, the display device wherein the plural of liquid crystal layers comprises a yellow-colored liquid crystal layer, a cyan-colored liquid crystal layer, and a magenta-colored liquid crystal layer, is provided.

According to the invention, the pair of electrodes may be constructed to be a simple matrix drive system.

As embodiments of the invention, there are provided the display device further comprising a pair of plastic substrates supporting the pair of electrodes respectively; the display device further comprising at least one antireflection film; the display device further comprising a substrate supporting the antireflection film; the display device further comprising a barrier layer; and the display device further comprising a ultraviolet-absorbing layer.

The antireflection film may be disposed on a surface of either of the pair of electrodes, or may be an inorganic thin film, organic thin film or a combination of an inorganic thin film and an organic thin film.

Figure 1:
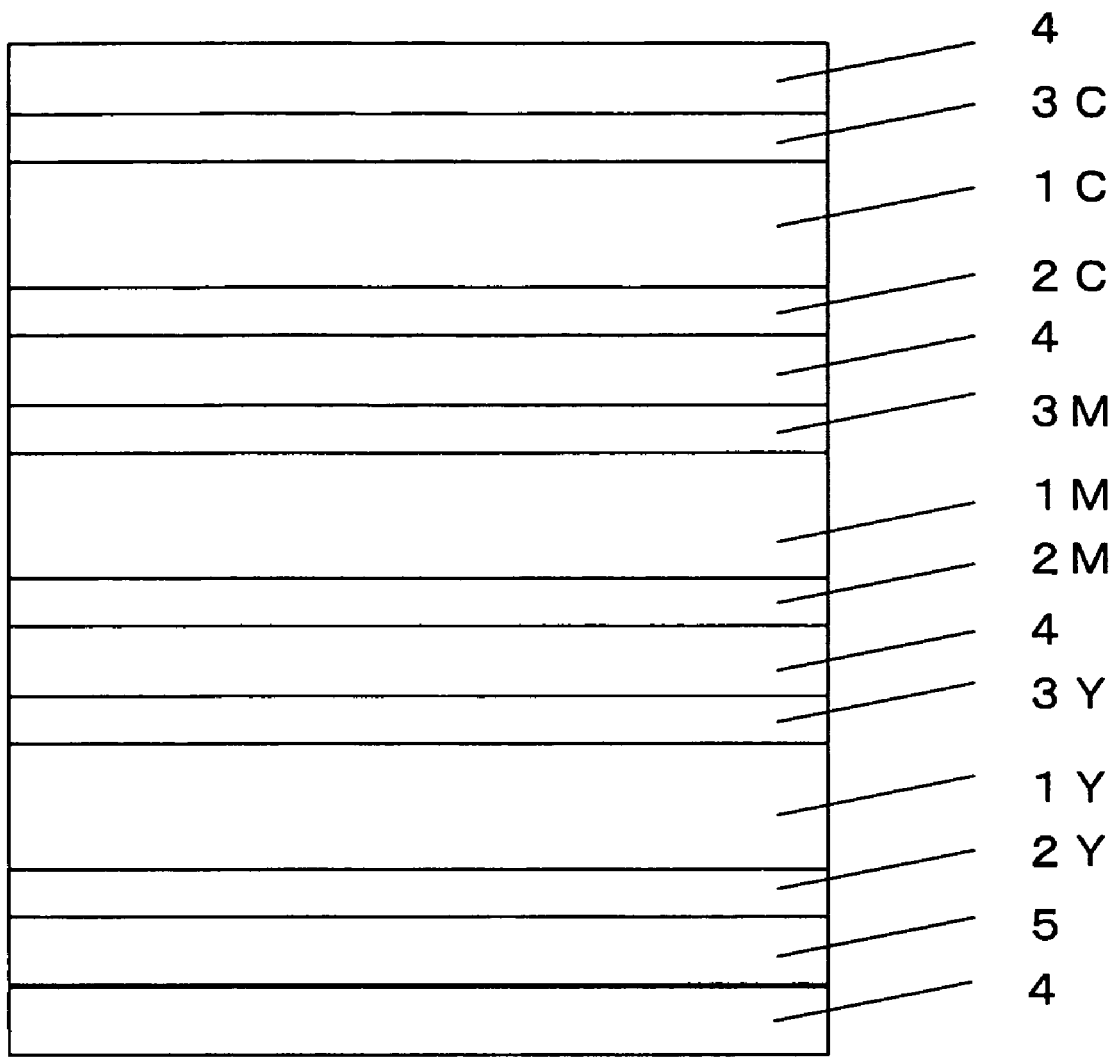
FIG. 1 is a schematic sectional drawing showing an example of a display device of the present invention.

Reference numerals used in the drawings express the followings:
  1Y yellow-colored liquid crystal layer,
  1M magenta-colored liquid crystal layer,
  1Cc cyan-colored liquid crystal layer,
  1R red-colored liquid crystal layer,
  1G green-colored liquid crystal layer,
  1B blue-colored liquid crystal layer,
  each of 2Y, 2M, 2C, 2a, and 2b electrode
  each of 3Y, 3M, 3C, 3a and 3b electrode
  each of 2Y', 2M' and 2C' a set of electrode and TFT
  each of 3Y', 3M' and 3C' electrode
  4 substrate, and
  5 scattering reflective layer

DETAILED DESCRIPTION OF THE INVENTION

The present invention is described in detail below. It is to be understood, in this description, that the term "... to ..." is used as meaning a range inclusive of the lower and upper values disposed therebefore and thereafter.

The present invention relates to a display device comprising a plural of liquid crystal layers. Each of the liquid crystal layers is disposed between a pair of electrodes, shows an absorption peak at a different wavelength, and comprises at least one dichroic dye and at least one dual-frequency switchable liquid crystal as a host liquid crystal.

In the following paragraphs, materials and processes which can be employed for producing the display device of the invention and possible configurations of the device are described in detail.

The display device of the invention comprises a plural of liquid crystal layers showing an absorption peak at a different wavelength from each other. Each of the liquid crystal layers can be formed of a liquid crystal composition comprising at least one dichroic dye and host liquid crystal showing a dual-frequency switchable property.

In this description, the term "dichroic dye" is used for any compounds which are dissolved in host liquid crystal and showing an absorption peak at a visible light wavelength.

The dichroic dye used in the present invention may show any absorption maximum and any absorption band, and, for the embodiments displaying full-color images, a yellow-colored liquid crystal layer, a magenta-colored liquid crystal layer and a cyan-colored liquid crystal layer are preferably employed, and, thus, dichroic dyes having an absorption maximum in a yellow region (Y), a magenta region (M) or a cyan region (C) are preferably employed for producing the liquid crystal layers respectively. Also the dichroic dye may be employed singly or in a mixture of plural types. In case of mixing plural dyes, a mixture of dichroic dyes having an absorption maximum in Y, M or C is preferably employed. A method of obtaining a full-color display by mixing a yellow dye, a magenta dye and a cyan dye is described in detail in "Color Chemistry", Sumio Tokita, Maruzen (1982). The yellow region, magenta region and cyan region mentioned above respective1Y mean a region of 430 to 490 nm, a region of 500 to 580 nm and a region of 600 to 700 nm.

The dichroic dye may be selected from compounds having any chromophoric group. Examples of the chromophoric group include azo dye residues, anthraquinone dye residues, perylene dye residues, merocyanine dye residues, azomethyne dye residues, phtaloperylene dye residues, indigo dye residues, azulene dye residues, dioxazine dye residues, polythiophene dye residues and phenoxazine dye residues. Among these, azo dye residues, anthraquinone dye residues and phenoxazine dye residues are preferred, and anthraquinone dye residues and phenoxazine dye, such as phenoxazine-3-one, residues are more preferred.

Examples of the azo dye include monoazo, diazo, trisazo, tetrakisazo and pentakisazo dyes. Among these, monoazo, bisazo or trisazo dyes are preferred.

The azo dye may contain any ring such as an aromatic ring (for example, benzene ring or naphthalene ring) and a hetero ring (for example, quinoline ring, pyridine ring, thiazole ring, benzothiazole ring, oxazole ring benzoxazole ring, imidazole ring, bennzoimidazole ring or pyrimidine ring).

The anthraquinone dye desirably has at least one substituent containing an oxygen atom, a sulfur atom or a nitrogen atom, such as an alkoxy group, an aryloxy group, an alkylthio group, an arylthio group, an alkylamino group or an arylamino group. The number of the substituents included in the anthraquinone dye is not limited to any range, and, in general, di-substituted, tri-substituted or tetrakis-substituted anthraquinone dyes are preferred, and di-substituted or tri-substituted anthraquinone dyes are more preferred. The substituents may bond to any position of anthraquinone rings, and, in general, 1,4-di-substituted, 1,5-di-substituted, 1,4,5-tri-substituted, 1,2,4-tri-substituted, 1,2,5-tri-substituted, 1,2,4,5-tetra-substituted and 1,2,5,6-tetra-substituted anthraquinone dyes are preferred.

The phenoxazine dye such as phenoxazine-3-one desirably has at least one substituent containing an oxygen atom, a sulfur atom or a nitrogen atom, such as an alkoxy group, an aryloxy group, an alkylthio group, an arylthio group, an alkylamino group or an arylamino group.

The dichroic dye, which can be used in the present invention, is preferably selected from dichroic dyes having at least one substituent represented by a formula (1).

In the formula, Het represents an oxygen atom or a sulfur atom; $B^1$ and $B^2$ respectively represent a substituted or non-substituted arylene group, heteroarylene group or divalent cyclic aliphatic hydrocarbon group; $Q^1$ represents a divalent linking group; $C^1$ represents a substituted or non-substituted alkyl group, cycloalkyl group, alkoxy group, alkoxycarbonyl group, acyl group or acyloxy group; j represents 0 or 1, p, q and r respectively represent an integer from 0 to 5; and n represents an integer from 1 to 3, provided that a total number of groups represented by $B^1$ and $B^2$ in the formula (1) is from 3 to 10; in case any of p, q and r is equal to or larger than 2, $B^1$, Q or $B^2$ present in two or more units maybe same or different to each other; and, in case n is equal to or larger than 2, $\{(B^1)_p\text{-}(Q^1)_q\text{-}(B^2)_r\}$ present in two or more units may be same or different to each other.

Het represents an oxygen atom or a sulfur atom, and preferably a sulfur atom.

$B^1$ and $B^2$ respectively represent a substituted or non-substituted arylene group, heteroarylene group or divalent cyclic aliphatic hydrocarbon group.

The arylene group represented by $B^1$ or $B^2$ is desirably selected from $C_{6\text{-}20}$ arylene group. Preferred examples of the arylene group include divalent residues of substituted or non-substituted benzene, substituted or non-substituted naphthalene and substituted or non-substituted anthracene. Divalent residues of benzene or substituted benzene are more preferred and 1,4-phenylene is especially preferred.

The heteroarylene group represented by $B^1$ or $B^2$ is desirably selected from $C_{1\text{-}20}$ heteroarylene group. Preferred examples of the heteroarylene group include divalent residues of pyridine, quinoline, isoquinoline, pyrimidine, pyrazine, thiophene, furan, oxazole, thiazole, imidazole, pyrazole, oxadiazole, thiadiazole, triazole and heteroaryl ring condensed one kind of rings or two or more kinds of rings selected therefrom. The divalent cyclic aliphatic hydrocarbon group represented by $B^1$ or $B^2$ is desirably selected from the group consisting of cyclohexane-1,2-diyl, cyclohexane-1,3-diyl, cyclohexane-1,4-diyl and cyclopentane-1,3-diyl, and is more desirably (E)-cyclohexane-1,4-diyl.

The arylene group, heteroarylene group or divalent cyclic aliphatic hydrocarbon represented by $B^1$ or $B^2$ may have a substituent, and the substituent is desirably selected from Substituent Group V shown below.

(Substituent Group V)

Halogen atom such as chlorine, bromine, iodine or fluorine; a mercapto group, a cyano group, a carboxyl group, a phosphoric acid group, a sulfonic acid group, a hydroxy group, a $C_{1\text{-}10}$, desirably $C_{2\text{-}8}$ and more desirably $C_{2\text{-}5}$ carbamoyl group such as methylcarbamoyl, ethylcarbamoyl or morpholinocarbamoyl; a $C_{0\text{-}10}$, desirably $C_{2\text{-}8}$ and more desirably $C_{2\text{-}5}$ sulfamoyl group such as methylsulfamoyl, ethylsulfamoyl orpiperidinosulfamoyl; a nitro group; a $C_{1\text{-}20}$, desirably $C_{1\text{-}10}$ and more desirably $C_{1\text{-}8}$ alkoxy group such as methoxy, ethoxy, 2-methoxyethoxy or 2-phenylethoxy; a $C_{6\text{-}20}$, desirably $C_{6\text{-}12}$ and more desirably $C_{6\text{-}10}$ aryloxy group such as phenoxy, p-methylphenoxy, p-chlorophenoxy or naphthoxy; a $C_{1\text{-}20}$, desirably $C_{2\text{-}12}$ and more desirably $C_{2\text{-}8}$ acyl group such as acetyl, benzoyl or trichloroacetyl; a $C_{1\text{-}20}$, desirably $C_{2\text{-}12}$ and more desirably $C_{2\text{-}8}$ acyloxy group such as acetyloxy or benzoyloxy; a $C_{1\text{-}20}$, desirably $C_{2\text{-}12}$ and more desirably $C_{2\text{-}8}$ acylamino group such as acetylamino; a $C_{1\text{-}20}$, desirably $C_{1\text{-}10}$ and more desirably $C_{1\text{-}8}$ sulfonyl group such as methanesulfonyl, ethanesulfonyl or benzenesulfonyl; a $C_{1\text{-}20}$, desirably $C_{1\text{-}10}$ and more desirably $C_{1\text{-}8}$ sulfinyl group such as methanesulfinyl, ethanesulfinyl or benzenesulfinyl; a $C_{1\text{-}20}$, desirably $C_{1\text{-}12}$ and more desirably $C_{1\text{-}8}$ substituted or non-substituted amino group such as non-substituted amino, methylamino, dimethylamino, benzylamino, anilino, diphenylamino, 4-methylphenylamino, 4-ethylphenylamino, 3-n-propylphenylamino, 4-n-propyl phenylamino, 3-n-butylphenylamino, 4-n-butylphenylamino, 3-n-pentylpehnylamino, 4-n-pentylphenylamino, 3-trifluoro methylphenylamino, 4-trifluoromethylphenylamino, 2-pyridylamino, 3-pyridylamino, 2-thiazolylamino, 2-oxazolylamino, N,N-methylphenylamino, N,N-ethyl phenylamino; a $C_{0\text{-}15}$, desirably $C_{3\text{-}10}$ and more desirably $C_{3\text{-}6}$ ammonium group such as trimethylammonium or triethylammonium; a $C_{0\text{-}15}$, desirably $C_{1\text{-}10}$ and more desirably $C_{1\text{-}6}$ hydrazino group such as trimethylhydrazino; a $C_{1\text{-}5}$, desirably $C_{1\text{-}10}$ and more desirably $C_{1\text{-}6}$ ureido group such as non-substituted ureido or N,N-dimethylureido; a $C_{1\text{-}5}$, desirably $C_{1\text{-}10}$ and more desirably $C_{1\text{-}6}$ imido group such as succinimido; a $C_{1\text{-}20}$, desirably $C_{1\text{-}12}$ and more desirably $C_{1\text{-}8}$ alkylthio group such as methylthio, ethylthio or propylthio; a $C_{6\text{-}80}$, desirably $C_{6\text{-}40}$ and more desirably $C_{6\text{-}30}$ arylthio group such as phenylthio, p-methylphenylthio, p-chlorophenylthio, 2-pyridylthio, 1-naphthylthio, 2-naphthylthio, 4-propylcyclohexyl-4'-diphenylthio, 4-butylcyclohexyl-4'-diphenylthio, 4-pentylcyclohexyl-4'-diphenylthio, or 4-propylphenyl-2-ethynyl-4'-diphenylthio; a $C_{1\text{-}80}$, desirably $C_{1\text{-}40}$ and more desirably $C_{1\text{-}30}$ heteroarylthio group such as 2-pyridylthio, 3-pyridylthio, 4-pyridylthio, 2-quinolylthio, 2-frylthio, 2-pyrrolylthio; a $C_{2\text{-}20}$, desirably C$_{2-12}$ and more desirably C$_{2-8}$ alkoxycarbonyl group such as methoxycarbonyl, ethoxycarbonyl or 2-benzyloxycarbonyl; a C$_{6-20}$, desirably C$_{6-12}$ and more desirably C$_{6-10}$ aryloxycarbonyl group such as phenoxycarbonyl; a C$_{1-18}$, desirably C$_{1-10}$ and more desirably C$_{1-15}$ non-substituted alkyl group such as methyl, ethyl, propyl or butyl; a C$_{1-18}$, desirably C$_{1-10}$ and more desirably C$_{1-5}$ substituted alkyl group such as hydroxylmethyl, trifluoromethyl, benzyl, carboxyethyl, ethoxycarbonylethyl or acethylamino methyl, of which examples also include a C$_{2-18}$ (desirably C$_{3-10}$ and more desirably C$_{3-5}$) unsaturated hydrocarbon group such as vinyl, ethynyl, 1-cyclohexenel, benzylidine or benzylidene; a C$_{6-20}$, desirably C$_{6-15}$ and more desirably C$_{6-10}$ substituted or non-substituted aryl group such as phenyl, naphthyl, p-carboxyphenyl, p-nitrophenyl 3,5-dichlorophenyl, p-cyanophenyl, m-fluorophenyl, p-tolyl, 4-propylcyclohexyl-4'-diphenyl, 4-butylcyclohexyl-4'-diphenyl, 4-pentylcyclohexyl-4'-diphenyl or 4-propylphenyl-2-ethyl-4'-diphenyl; and a C$_{1-20}$, desirably C$_{2-10}$ and more desirably C$_{4-6}$ substituted or non-substituted heteroaryl group such as pyridyl, 5-methylpyridyl, thienyl, furyl, morpholino or tetrahydrofurfuryl.

The rings such as benzene or naphthalene ring included in the substituents exemplified above may be condensed with other rings. Examples of the substituent also include groups substituted with the substituent selected from Substituent Group V.

Among these, as a substituent of B$^1$ or B$^2$, the exemplified alkyl group, aryl group, alkoxy group, aryloxy group, halogen atom, non-substituted amino, substituted amino group, hydroxy, alkylthio group and arylthio group are preferred, and the exemplified alkyl group, aryl group or halogen atom are more preferred.

Q$^1$ is a divalent linking group. Q$^1$ may consist of at least one atom selected from carbon atom, nitrogen atom, oxygen atom or sulfur atom. Examples of the divalent linking group include C$_{0-60}$ divalent linking groups consisting of one or a combination of two or more selected from a C$_{1-20}$ alkylene group such as methylene, ethylene, propylene, butylene, pentylene or cyclohexyl-1,4-diyl, a C$_{2-20}$ alkenylene group such as ethenylene, a C$_{2-20}$ alkynylene such as ethynylene, an amido group (—NH—), an ether group (—O—), an ester group (—COO—), a sulfonamide group (—SO$_2$NH—), a sulfonate group (—SO$_3$—), a ureido group (—NH—CO—NH—), a sulfonyl group (—SO$_2$—), a sulfinyl group (—SO—), a thioether group (—S—), a carbonyl group (—CO—), —NR— (where R is a hydrogen atom, an alkyl group or an aryl group), an azo group (—N$_2$—), an azoxy group (—N$_2$(O)—) and a divalent heterocyclic group such as piperazine-1,4-diyl. Q$^1$ is desirably an alkylene group, an alkenylene group, an alkynylene group, an ether group, a thioether group, an amido gtoup, an ester group, a carbonyl group or a combination thereof. Q$^1$ may carry a substituent selected from the substituent group V described above.

C$^1$ represents an optionally substituted alkyl group, an optionally substituted cycloalkyl group, an optionally substituted alkoxy group, an optionally substituted alkoxycarbonyl group, an optionally substituted acyl group or an optionally substituted acyloxy group. Preferred examples of C$^1$ include a C$_{1-30}$, desirably C$_{1-12}$ and more desirably C$_{1-8}$ alkyl and cycloalkyl group such as methyl, ethyl, propyl, 1-propyl, butyl, 1-butyl, s-butyl, t-butyl, pentyl, t-pentyl, hexyl, heptyl, octyl, cyclohexyl, 4-methylcyclohexyl, 4-ethylcyclohexyl, 4-propylcyclohexyl, 4-butylcyclohexyl, 4-pentylcyclohexyl, hydroxymethyl, trifluoromethyl or benzyl; a C$_{1-20}$, desirably C$_{1-10}$ and more desirably C$_{18}$ alkoxy group such as methoxy, ethoxy, 2-methoxyethoxy or 2-phenylethoxy; a C$_{1-20}$, desirably C$_{2-12}$ and more desirably C$_{2-8}$ acyloxy group such as acetyloxyorbenzoyloxy; a C$_1$I$_{30}$, desirably C$_{1-12}$ and more desirably C$_{18}$ acyl group such as formyl, acetyl, pivaloyl, 2-chloroacetyl, stearoyl, benzoyl or p-n-octyloxyphenylcarbonyl; and a C$_{2-20}$, desirably C$_{2-12}$ and more desirably C$_{2-8}$ alkoxycarbonyl group such as methoxycarbonyl, ethoxycarbonyl or 2-benzyloxycarbonyl. C$^1$ is desirably selected from a substituted or non-substituted alkyl group, a substituted or non-substituted cycloalkyl group or a substituted or non-substituted alkoxy group, and more desirably selected from ethyl, propyl, butyl, pentyl, hexyl, or trifluoromethoxy. C$^1$ may carry a substituent selected from the substituent group V described above.

In the formula, j is 0 or 1, and preferably 0.

In the formula, p, q and r respectively represents an integer from 0 to 5 and n is an integer from 1 to 3, satisfying $3 \leq (p+r) \times n \leq 10$. Or in other words, the total numbers of B$^1$ and B$^2$ included in the formula is 3 to 10 (thinking about the case that n is 2 or more and p and r are different to each other, for example, thinking about the case of n=2, there are two p, one of them being p$^1$ and another being p$^2$, and two r, one of them being r$^1$ and another being r$^2$, the value of (p$^1$+r$^1$+p$^2$+r$^2$) should fall within the range from 3 to 10).

Preferred combinations of p, q and r are (i) to (ix) as shown below:

(i) P=3, q=0, r=0 and n=1;
(ii) P=4, q=0, r=0 and n=1;
(iii) P=5, q=0, r=0 and n=1;
(iv) P=2, q=0, r=1 and n=1;
(v) P=2, q=1, r=1 and n=1;
(vi) P=1, q=1, r=2 and n=1;
(vii) P=3, q=1, r=1 and n=1;
(viii) P=2, q=0, r=2 and n=1;
(ix) P=1, q=1, r=1 and n=2;
(x) P=2, q=1, r=1 and n=2;

Especially preferred combinations are (i) P=3, q=0, r=0 and n=1; (iv) P=2, q=0, r=1 and n=1; and (v) P=2, q=1, r=1 and n=1.

The substituent represented by the formula of -{(B$^1$)$_p$-(Q$^1$)$_q$-(B$^2$)$_r$}$_n$-C$^1$ preferably containing structures exhibiting liquid crystallinity. The structures may exhibit any kind of liquid crystallinity, however, preferably nematic, smectic, or discotic liquid crystallinity, more preferably nematic liquid crystallinity.

Specific examples of the substituent represented by the formula of -{(B$^1$)$_p$-(Q$^1$)$_q$-(B$^2$)$_r$}$_n$-C$^1$ will be listed below, which by no means restricts the present invention. In the following formulae, wave lines denote portions of bonding to Het.

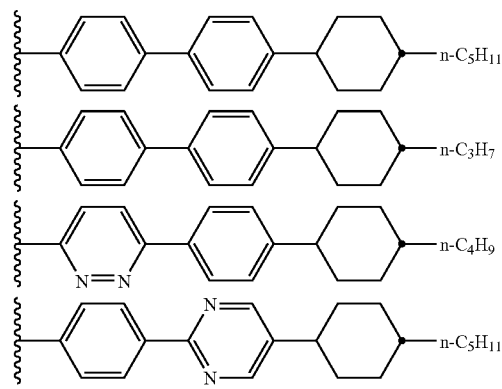

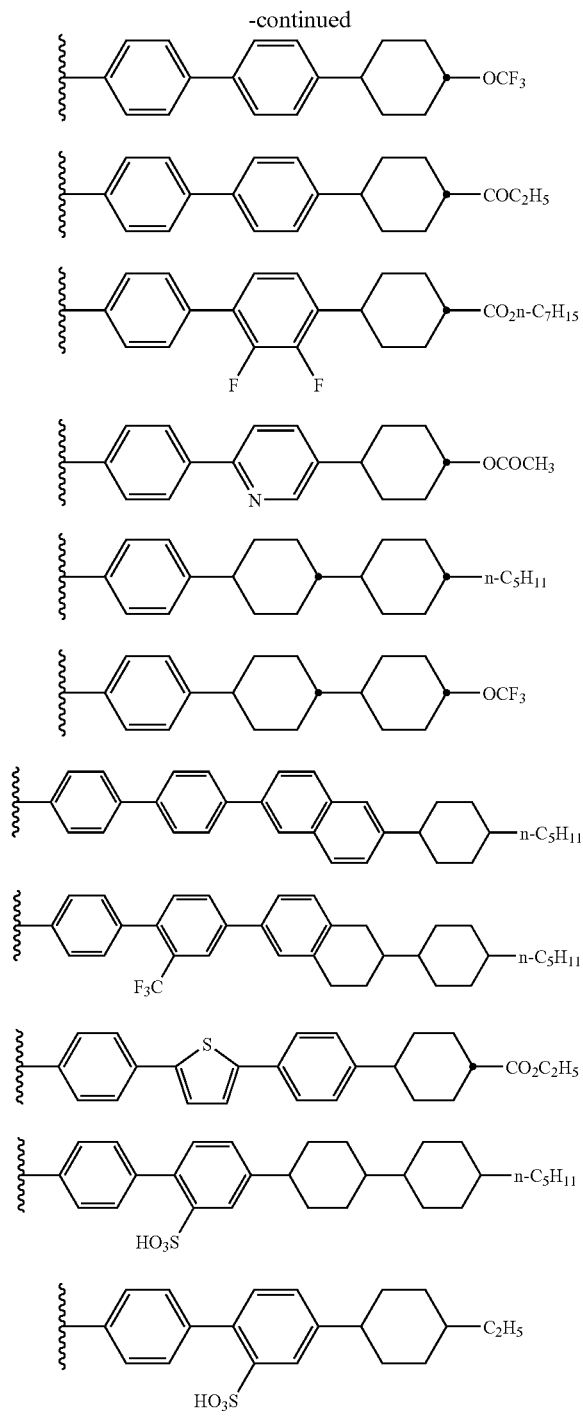

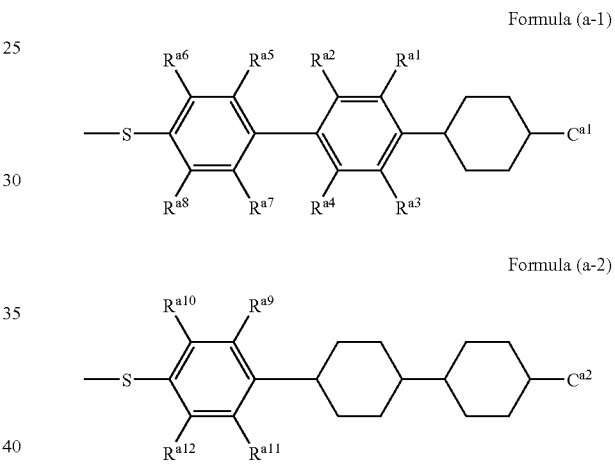

The dichroic dye to be used in the present invention desirably has at least one, more desirably 1 to 8, much more desirably 1 to 4 and further much more desirably 1 or 2 substituents represented by the formula (1), "-(Het)$_j$-{($B^1$)$_p$-($Q_1$)$_q$-($B^2$)$_r$}$_n$-$C^1$".

One of preferred examples of the substituent represented is a substituent represented by the formula in which Het is a sulfur atom, $B^1$ is a substituted or non-substituted arylene or heteroarylene group, $B^2$ is a cyclohexane-1,4-diyl group, $C^1$ is a substituted or non-substituted alkyl group, j=1, p=2, q=0, r=1 and n=1; and another preferred example of the substituent is a substituent represented by the formula in which Het is a sulfur atom, $B^1$ is a substituted or non-substituted arylene or heteroarylene group, $B^2$ is a cyclohexane-1,4-diyl group, $C^1$ is a substituted or non-substituted alkyl group, j=1, p=1, q=0, r=2 and n=1. One of especially preferred examples of the substituent is a substituent represented by a formula (a-1) shown below, or, in other words, a substituent represented by the formula in which Het is a sulfur atom, $B^1$ is a substituted or non-substituted 1,4-phenylen group, $B^2$ is a trans-cyclohexyl group, $C^1$ is a substituted or non-substituted alkyl group (preferably methyl, ethyl, propyl, butyl, pentyl or hexyl), j=1, p=2, q=0, r=1 and n=1; and another especially preferred example of the substituent is a substituent represented by a formula (a-2), or, in other words, a substituent represented by the formula in which Het is a sulfur atom, $B^1$ is a substituted or non-substituted 1,4-phenylene group, $B^2$ is a trans-cyclohexane-1,4-diyl group, $C^1$ is a substituted or non-substituted alkyl group (preferably methyl, ethyl, propyl, butyl, pentyl or hexyl), j=1, p=1, q=0, r=2 and n=1.

In the formulae, $R^{a1}$ to $R^{a12}$ respectively represent a hydrogenatomorasubstituent. The substituent is selected from Substituent Group V described above. It is preferred that $R^{ai}$ to $R^{a12}$ respectively represent a hydrogen atom, a halogen atom (preferably fluorine atom), a substituted or non-substituted alkyl group, a substituted or non-substituted aryl group or a substituted or non-substituted alkoxy group.

In the formulae, $C^{a1}$ and $C^{a2}$ respectively represent a substituted or non-substituted alkyl group, and preferably methyl, ethyl, propyl, butyl, pentyl or hexyl.

The dichroic dye which can be used in the present invention is desirably selected from the group represented by a formula (2) or a formula (3) shown below.

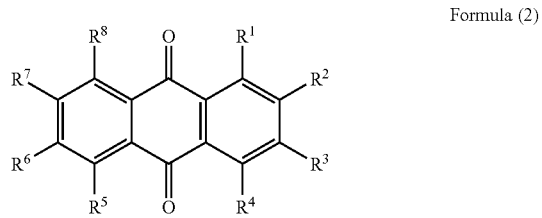

In the formula, $R^1$ represents a substituent represented by —S-{$(B^1)_p$-$(Q^1)_q$-$(B^2)_r$}$_n$-$C^1$, in which S represents a sulfur atom, and $B^1$, $B^2$, $Q^1$, p, q, r and n have same definitions and same preferred ranges as in the formula (1). $R^2$, $R^3$, $R^4$, $R^5$, $R^6$, $R^7$ and $R^8$ respectively represent a hydrogen atom or a substituent.

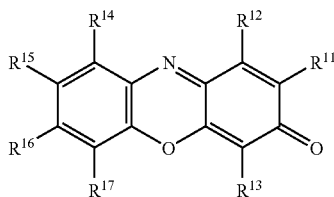

Formula (3)

In the formula, $R^{11}$, $R^{12}$ $R^{13}$, $R^{14}$, $R^{15}$, $R^{16}$, and $R^{17}$ each respectively represents a hydrogen atom or a substituent, but at least one (preferably $R^{14}$) represents a substituent represented by —S-{$(B^1)_p$-$(Q^1)_q$-$(B^2)_r$}$_n$-$C^1$, wherein S represents a sulfur atom, and $B^1$, $B^2$, $Q^1$, p, q, r and n have same definitions and have same preferable ranges as in the formula (1).

A substituent represented by $R^2$, $R^3$, $R^4$, $R^5$, $R^6$, $R^7$ or $R^8$ can be the aforementioned substituent group V, and preferred examples of the substituent include a substituted or non-substituted $C_{6-80}$, desirably $C_{6-40}$ and more desirably $C_{6-30}$ arylthio group such as phenylthio, p-methylphenylthio, p-chlorophenylthio, 4-methylphenylthio, 4-ethylphenylthio, 4-n-propylphenylthio, 2-n-butylphenylthio, 3-n-butylphenylthio, 4-n-butylphenylthio, 2-t-butylphenylthio, 3-t-butylphenylthio, 4-t-butylphenylthio, 3-n-pentylphenylthio, 4-n-pentylphenylthio, 4-amylpentylphenylthio, 4-hexylphenylthio, 4-heptylphenylthio, 4-octylphenylthio, 4-trifluoromethylphenylthio, 3-trifluoromethylphenylthio, 2-pyridylthio, 1-naphthylthio, 2-naphthylthio, 4-propylcyclohexyl-4'-biphenylthio, 4-butylcyclohexyl-4'-biphenylthio, 4-pentylcyclohexyl-4'-biphenylthio, or 4-propylphenyl-2-ethynyl-4'-biphenylthio; a substituted or non-substituted $C_{1-80}$, more desirably $C_{1-40}$ and much more desirably $C_{1-30}$ heteroarylthio group such as 2-pyridylthio, 3-pyridylthio, 4-pyridylthio, 2-quinolylthio, 2-furylthio or 2-pyrrolylthio; a substituted or non-substituted alkylthio group such as methylthio, ethylthio, butylthio or phenethylthio; a substituted or non-substituted amino group such as non-substituted amino, methylamino, dimethylamino, benzylamino, anilino, diphenylamino, 4-methylphenylamino, 4-ethylphenylamino, 3-n-propylphenylamino, 4-n-propylphenylamino, 3-n-butylphenylamino, 4-n-butylphenylamino, 3-n-pentylphenylamino, 4-n-pentylphenylamino, 3-trifluoromethylphenylamino, 4-trifluoromethylphenylamino, 2-pyridylamino, 3-pyridylamino, 2-thiazolylamino, 2-oxazolylamino, N,N-methylphenylamino or N,N-ethylphenylamino; a halogen atom such as a fluorine atom or a chlorine atom; a substituted or non-substituted alkyl group such as methyl, or trifluoromethyl; a substituted or non-substituted alkoxy group such as mehtoxy, or trifluoromethoxy; a substituted or non-substituted aryl group such as phenyl; a substituted or non-substituted heteroaryl group such as 2-pyridyl; a substituted or non-substituted aryloxy group such as phenoxy; and a substituted or non-substituted heteroaryloxy group such as 3-thienyloxy.

$R^2$, $R^3$, $R^4$, $R^5$, $R^6$, $R^7$ and $R^8$ each is preferably a hydrogen atom, a fluorine atom, a chlorine atom or a hydroxy, or an arylthio group, an alkylthio group, an amino group, an alkylamino group, an arylamino group, an alkyl group, an aryl group, an alkoxy group or an aryloxy group each of which can be substituted or non-substituted. $R^2$, $R^3$, $R^4$, $R^5$, $R^6$, $R^7$ and $R^8$ each is more preferably a hydrogen atom or a fluorine atom, or an arylthio group, an alkylthio group, an amino group, an alkylamino group or an arylamino group each of which may be substituted or non-substituted. In one preferred example, $R^2$, $R^3$, $R^6$ and $R^7$ each is a hydrogen atom, and $R^4$, $R^5$ and $R^8$ respectively represents a fluorine atom, or an arylthio group, an alkylthio group, an amino group, an alkylamino group or an arylamino group each of which may be substituted or non-substituted; and in the more preferred example, $R^2$, $R^3$, $R^6$ and $R^7$ each is a hydrogen atom, and $R^4$, $R^5$ and $R^8$ respectively represents an arylthio group which may be substituted or non-substituted. In another preferred example, $R^2$, $R^3$, $R^4$, $R^6$, $R^7$ and $R^8$ each is a hydrogen atom, and $R^5$ is a fluorine atom or an arylthio group, an alkylthio group, an amino group, an alkylamino group or an arylamino group each of which may be substituted or non-substituted; and in the more preferred example, $R^2$, $R^3$, $R^4$, $R^6$, $R^7$ and $R^8$ each is a hydrogen atom, and $R^5$ is an arylthio group which may be substituted or non-substituted, A substituent represented by $R^{11}$, $R^{12}$, $R^{13}$, $R^{14}$, $R^{15}$ or $R^{17}$ is preferably a halogen atom or a hydroxy, or an alkyl group, an aryl group, an alkylthio group, an arylthio group, a heterocyclic thio group, an alkoxy group, an aryloxy group, a carbamoyl group, an acyl group, an aryloxycarbonyl group, an alkoxycarbonyl group or an amide group each of which may be substituted or non-substituted.

$R^{16}$ is preferably a substituted or non-substituted amino group (including alkylamino or arylamino), a hydroxy, a mercapto group, a substituted or non-substituted alkylthio group, a substituted or non-substituted arylthio group, a substituted or non-substituted alkoxy group or a substituted or non-substituted aryloxy group, and particularly preferably a substituted or non-substituted amino group.

In one preferred example, $R^4$ is a group of —S-{$(B^1)_p$-$(Q^1)_q$-$(B^2)_r$}$_n$-$C^1$, $R^{12}$, $R^{13}$, $R^{15}$ and $R^{17}$ each is a hydrogen atom, and $R^{16}$ is a substituted or non-substituted amino group (including alkylamino or arylamino), a hydroxy, a mercapto group, a substituted or non-substituted alkylthio group, a substituted or non-substituted arylthio group, a substituted or non-substituted alkoxy group or a substituted or non-substituted aryloxy group; and in the more preferred example, $R^4$ is a group of —S-{$(B^1)_p$-$(Q^1)_q$-$(B^2)_r$}$_n$-$C^1$, $R^{12}$, $R^{13}$, $R^{15}$ and $R^{17}$ each is a hydrogen atom, and $R^{16}$ is a substituted or non-substituted amino group (including alkylamino or arylamino).

The cyan dichroic dye is preferably selected from the group represented by the formula (3), and the yellow and magenta dichroic dye each is preferably selected from the group represented by the formula (2).

Examples of the dichroic dye, which can be used in the present invention, include, however not to be limited to, the compounds shown below.

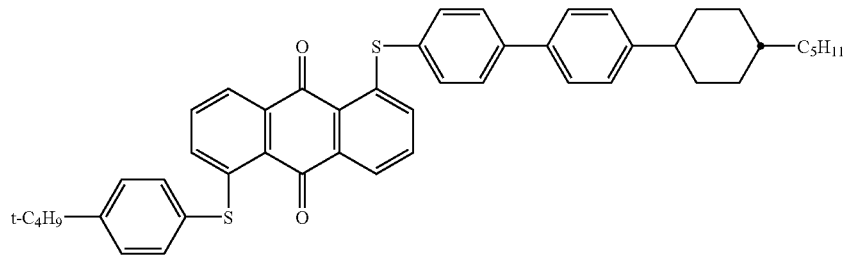
No. 1-1
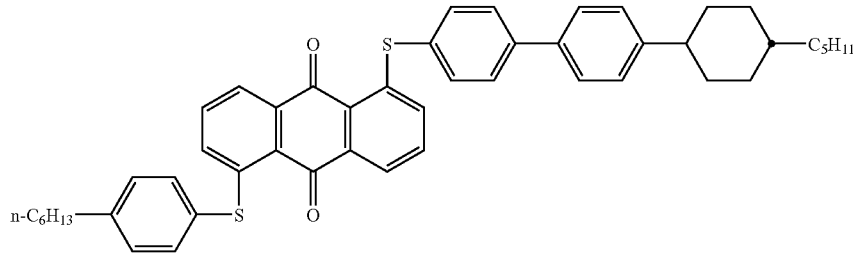
No. 1-2
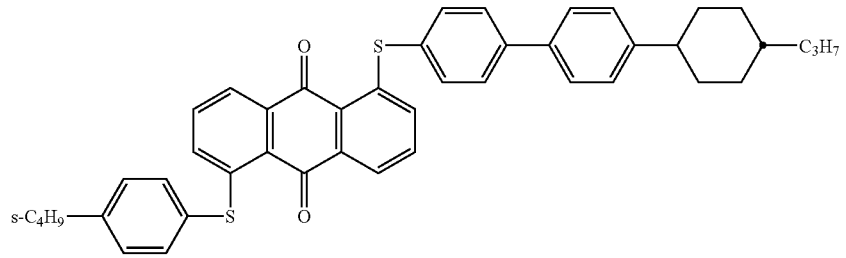
No. 1-3
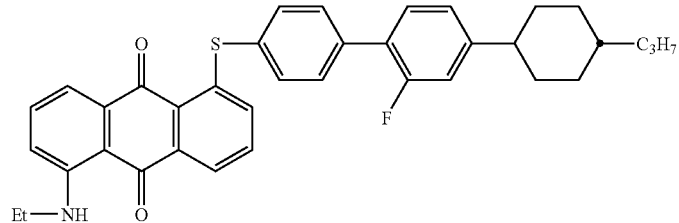
No. 1-4
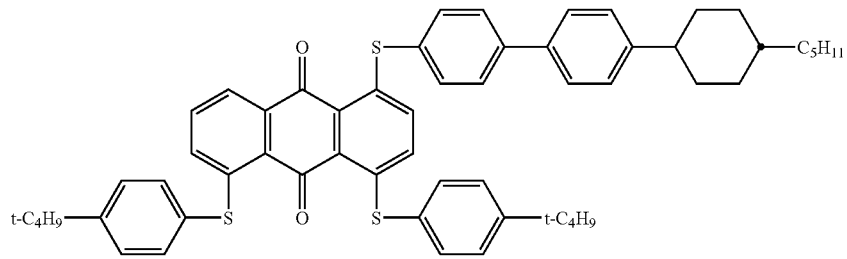
No. 1-5
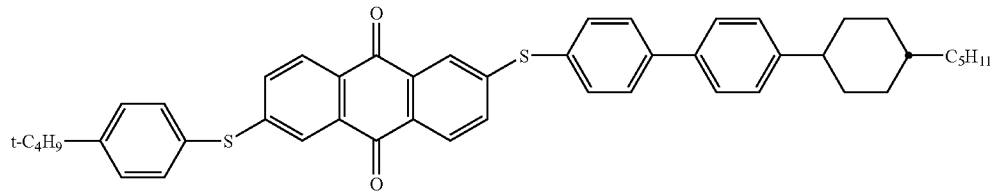
No. 1-6

-continued
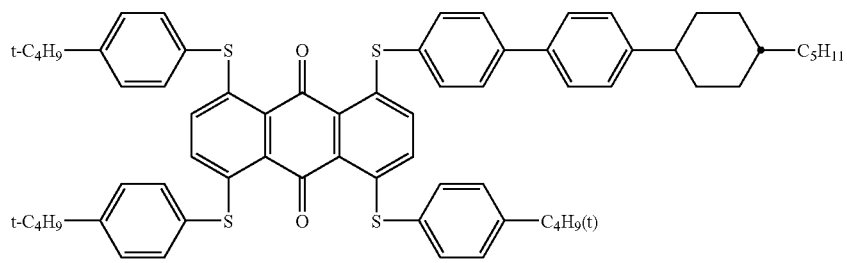
No. 1-7
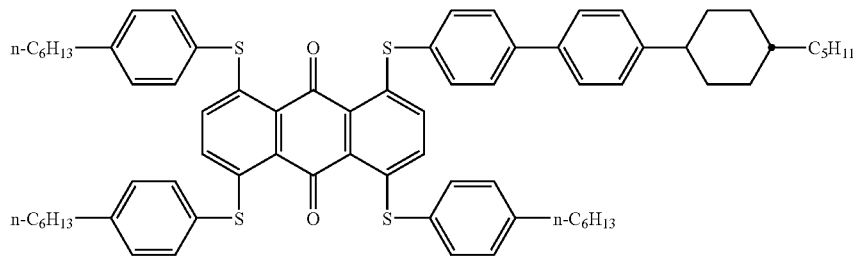
No. 1-8
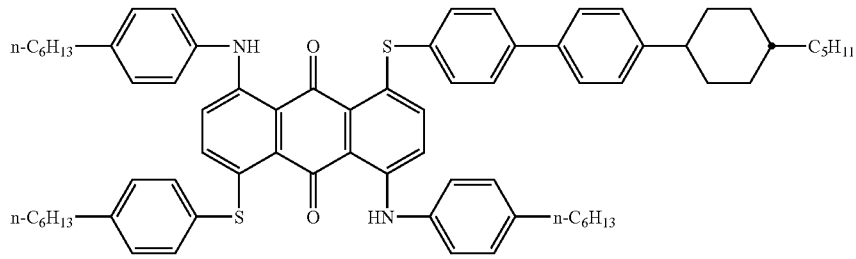
No. 1-9
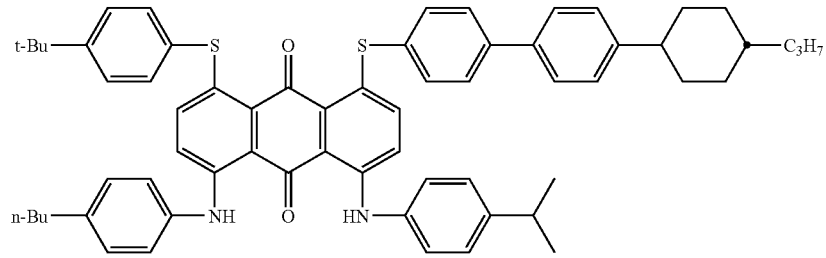
No. 1-10
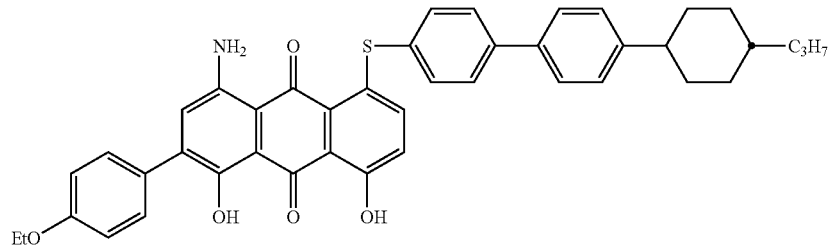
No. 1-11
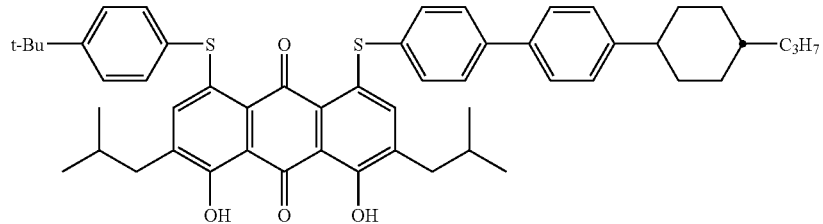
No. 1-12

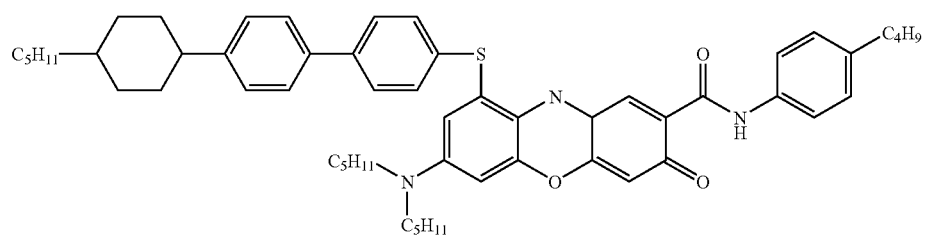
No. 1-13
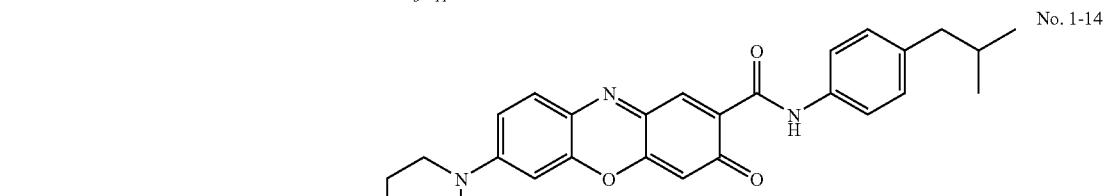
No. 1-14
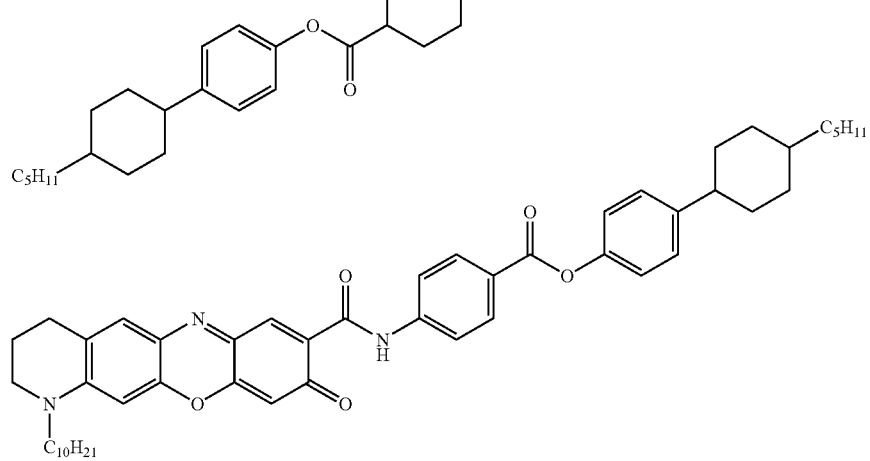
No. 1-15
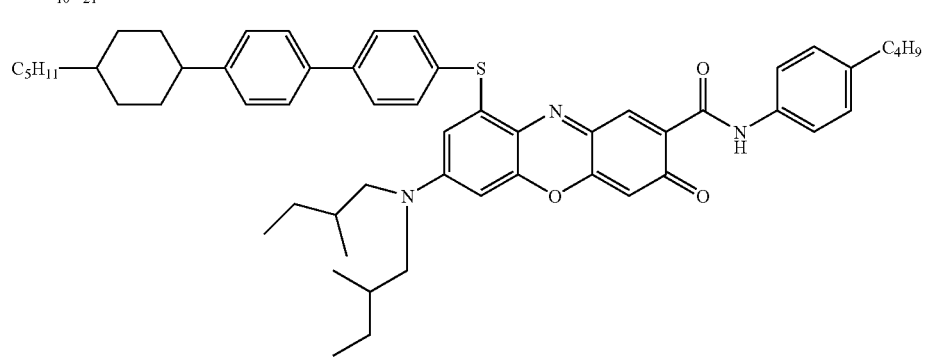
No. 1-16
Examples of the dichroic dioxazine dye, which can be used in the present invention, include, however not to be limited to, the compounds shown below.
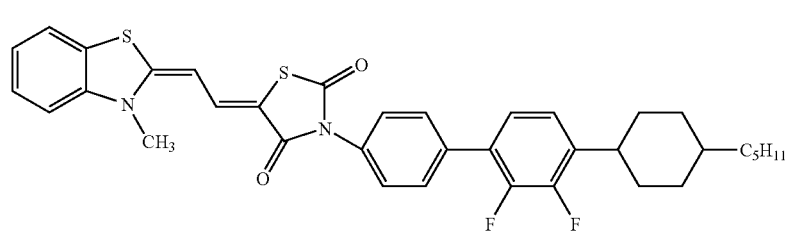
No. 3-1

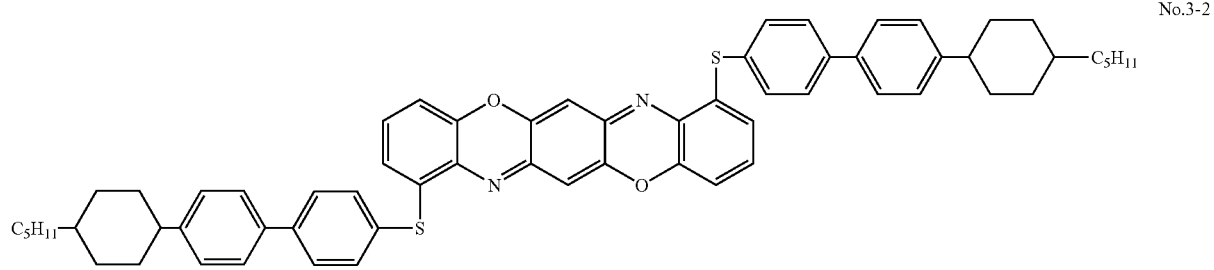

No.3-2

The dichroic dye having the substituent represented by the formula (1) can be produced according to any known method or combination thereof, for example, a method disclosed in JPA No, 2003-192664.

According to the present invention, each liquid crystal layer is formed of a liquid crystal composition comprising a dual-frequency switchable liquid crystal as host liquid crystal. Employing a dual-frequency switchable.liquid crystal as host liquid crystal, the orientation of the liquid crystal layer can be changed reversibly even without an alignment layer, and the liquid crystal layer can show a high displaying quality when being driven by a pair of electrodes employing a simple passive matrix construction. The term "dual-frequency switchable liquid crystal" means a liquid crystal exhibiting a positive dielectric anisotropy while being in an electric field of a low frequency range and exhibiting an inversion to a negative dielectric anisotropy while being in an electric field of a high frequency range, described in *Liquid Crystal Device Handbook*, Japan Society for the Promotion of Science, Committee 142, p. 189-192 (1989), published by Nikkan Kogyo Shimbun) in detail. Specific examples of such liquid crystal include those shown in the following, manufactured by Sigma-Aldrich, Inc. Dual-frequency switchable liquid crystal No. 1

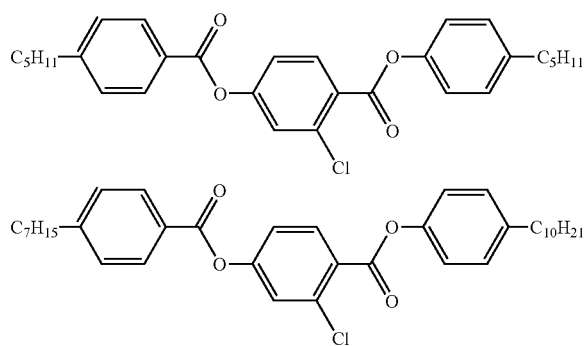

The examples also include commercially available dual-frequency switchable liquid crystals such as DF-02XX, DF-05XX, FX-1001 and FX-1002 manufactured by Chisso Co., and MLC-2048 manufactured by E. Merck Inc.

Specific examples of the skeleton of the dual-frequency switchable liquid crystal include an azomethine compound, a cyanobiphenyl compound, a cyanophenyl ester, a fluorine-substituted phenyl ester, a cyclohexanecarboxylate phenyl ester, a fluorine-substituted cyclohexanecarboxylate phenyl ester, cyanophenylcyclohexane, a fluorine-substituted phenylcyclohexane, a cyano-substituted phenylpyrimidine, a fluorine-substituted phenylpyrimidine, an alkoxy-substituted phenylpyrimidine, a fluorine-substituted, alkoxy-substituted phenylpyrimidine, phenyldioxane, a tolan compound, a fluorine-substituted tolan compound, and alkenylcyclohexyl benzonitrile.

The dual-frequency switchable liquid crystal, which can be employed in the present invention as host liquid crystal, may be a mixture of liquid crystal compounds. And the host liquid crystal may also comprise liquid crystal that does not show an inversion of the sign of the dielectric anisotropy between a low frequency region and a high frequency region of the applied electric field.

A frequency range of the voltage to be applied to the liquid crystal layer is preferably within a range of 0.1 Hz to 10 MHz, and more preferably 1 Hz to 1 MHz. A frequency in the low frequency region is preferably 0.1 Hz to 100 kHz, more preferably 1 Hz to 10 kHz and further preferably 10 Hz to 10 kHz. Also a frequency in the high frequency region is preferably 100 Hz to 10 MHz, more preferably 100 Hz to 1 MHz and further preferably 1 kHz to 1 MHz.

According to the present invention, for adjusting the properties of host liquid crystal within a preferred range, for example, adjusting the temperature range, in which host liquid crystal exhibits a liquid crystal phase, within a preferred rang, non liquid-crystalline compounds may be added to the liquid crystal layer. The liquid crystal layer may also further comprise an additive such as a chiral agent, an ultraviolet absorber or an antioxidant. Examples of such additives include chiral agents for TN or STN mode, described in *Liquid Crystal Device Handbook,* Japan Society for the Promotion of Science, Committee 142, p. 199-202 (1989), Published by Nikkan Kogyo Shimbun). Adding with a chiral agent, host liquid crystal may exhibit a cholesteric liquid crystal phase in which dichroic dyes dissolved in host liquid crystal such as nematic liquid crystal are helically-arranged. As a result, a cell comprising a liquid crystal layer employing such a composition may absorb both of linearly polarized lights which are perpendicular to each other, and be improved in light absorption amount in a color state. On the other hand, a cell comprising a liquid crystal layer employing nematic liquid crystal uniaxially-aligned can theoretically absorb either of linearly polarized lights which are perpendicular to each other.

The amount of a chiral agent is preferably from 0.1 to 20 wt %, more preferably from 0.5 to 10 wt %, and much more preferably from 0.5 to 5 wt % with respect to the total weight of the liquid crystal composition. Adding with more than 20 wt %, the photochromic property may be lowered since selective reflection is sometimes observed at a visible wavelength or some chiral agent separate out from host liquid crystal. Two or more types of chiral agents may be used in the present invention. Using two types of chiral agents, one showing a positive dependency of a chiral pitch on temperature and another showing a negative dependency of a chiral pitch on temperature, can contribute to reducing the degree of chiral pitch dependency on temperature, and, thus, is preferred.

Examples of the chiral agent, which can be employed in the present invention, include, but are not limited to, compounds shown below.

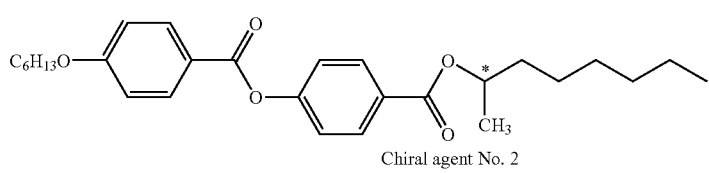

Chiral agent No. 1

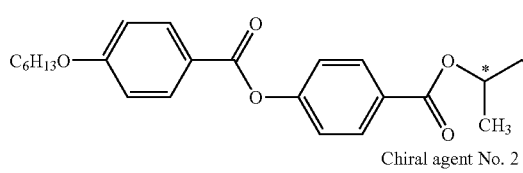

Chiral agent No. 2

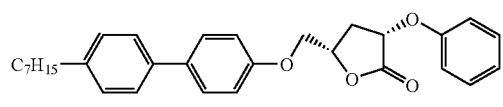

Chiral agent No. 3

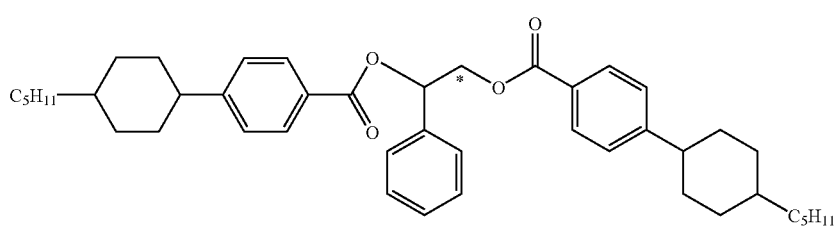

Chiral agent No. 4

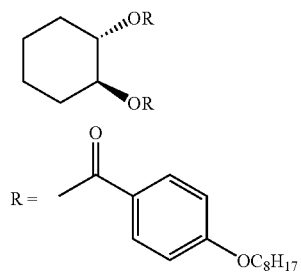

Chiral agent No.5

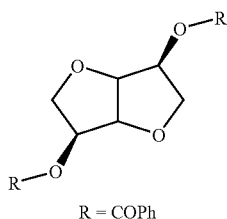

Chiral agent No. 6

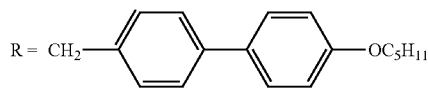

Chiral agent No. 7

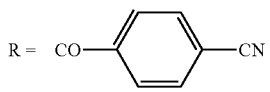

Chiral agent No.8

Chiral agent No.9

Chiral agent No. 10

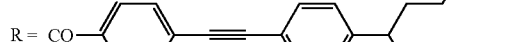

Chiral agent No.11

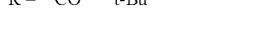

Chiral agent No.12

Chiral agent No.13

Chiral agent No.14

Chiral agent No.15

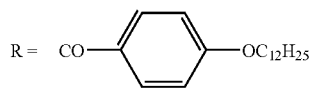

Chiral agent No.16

R = CO—t-Bu

Chiral agent No.17

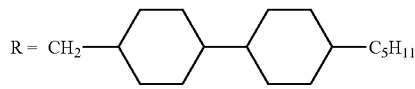

According to the present invention, one preferred embodiment of the liquid crystal layer is a liquid crystal layer, containing a chiral agent, capable of exhibiting a chiral nematic liquid crystal phase. Examples of the chiral agent include "R-811", "S-811", "R-1082" and "S-1082" manufactured by Merck. The amount of the chiral agent is preferably from 0.01 to 15% and more preferably from 0.5 to 6% with respect to the total weight of host liquid crystal.

According to the present invention, the amounts of host liquid crystal and the dichroic dye contained in each liquid crystal layer is not to be limited to a range, and the amount of the dichroic dye contained in each liquid crystal layer is preferably from 0.1 to 15% and more preferably from 0.5 to 6% with respect to the total weight of the host liquid crystal contained in the liquid crystal layer.

Also a dye concentration, required for obtaining a desired optical density, is preferably determined by producing a liquid crystal cell with the liquid crystal composition and measuring an absorption spectrum of such liquid crystal cell.

The display device of the present invention comprises a pair of electrodes. The electrode may comprise a substrate and a conductive layer (an electrode layer) disposed thereon. Examples of the substrate include glass plates or plastic films, and such a substrate having a conductive layer thereon can be used as an electrode substrate. Examples of the plastic film include acryl based polymer films, polycarbonate based polymer films, epoxy based polymer films, PES films and PEN films. Examples of the substrate are described for example in Liquid Crystal Device Handbook, Japan Society for the Promotion of Science, Committee 142, p. 218-231 (1989), Published by Nikkan Kogyo Shimbun). On the substrate, there is formed an electrode layer, which is preferably an transparent electrode. The electrode layer can be constituted for example indium oxide, indium tin oxide (ITO), or tin oxide. The transparent electrode can for example be those described in Liquid Crystal Device Handbook, Japan Society for the Promotion of Science, Committee 142, p. 232-239 (1989), Published by Nikkan Kogyo Shimbun).

The display device of the present invention may be produced as follows:

A liquid crystal cell is produced by filling a gap of 1 to 50 μm, formed between a pair of electrode substrates by means of a spacer or the like, with a liquid crystal composition, to form a liquid crystal layer having an absorption peak at λ1 between the pair of electrode substrates; another liquid crystal cell is produced by forming a liquid crystal layer having an absorption peak at 2 (λ2≈λ1) between a pair of electrode substrates according to the same process; and the two liquid crystal cells obtained are stacked. A full-color display device can be produced by stacking a cyan-colored, a magenta-colored and a yellow-colored liquid crystal cells which are produced respectively. Each liquid crystal layer may be also formed between a pair of electrodes by applying a liquid crystal composition to a surface of the electrode with a coating or printing technique. For reducing the number of the substrates employed in the device and the thickness of the device as a whole, a substrate having an electrode layer on both of its surface and its rear face may be disposed at a position between two liquid crystal layers. A display device having such a configuration can be produced by forming each liquid crystal layer on a surface of each electrode one after another.

Examples of the employable spacer are described for example in Liquid Crystal Device Handbook, Japan Society for the Promotion of Science, Committee 142, p. 257-262 (1989), Published by Nikkan Kogyo Shimbun).

The liquid crystal composition can be provided in a space between the substrates, by coating or printing on the substrate.

The display device of the present invention may further comprise other members. Example of other members include a barrier layer, a ultraviolet-absorbing layer, an antireflection layer, a hard coat layer, an antifouling layer, an organic interlayer insulation film, a reflecting metal plate, a retardation plate and an alignment layer. One member or a combination of two or more members may be employed in the device of the present invention.

The barrier layer may prevent moisture from penetrating from the air into the liquid crystal layers, and contribute to lengthening the life of the display device. The material for the barrier layer is not to be limited, and may be selected from organic polymers, inorganic materials or complex materials. Examples of the organic polymer include ethylene-vinyl alcohols (EVOH), polyvinyl alcohols (PVA/PVOH), nylon MXD6 (N-MXD) and nanocomposite base nylons. Examples of the inorganic material include silica base materials, alumina base matirals, and binary materials. Those are described in detail in "Development of High-Barrier Materials, Film Formation Techniques, and Measurement and Evaluation Methods of Barrier Properties" published by Technical Information Institute Co., Ltd. in 2004.

The ultraviolet-absorbing layer may prevent the materials contained in the liquid crystal layers from being exposed to ultraviolet light by absorbing the ultraviolet light, and contribute to improving light durability of the display device. The material for the ultraviolet-absorbing layer is not to be limited, and examples of the material include known ultraviolet absorbing agents such as 2-(3-t-butyl-5-methyl-2-hydroxyphenyl)-5-chlorobenzene tri azole and alkoxy benzophenone; and known antioxidizing agents such as 2,2-thiobis(4-methyl-6-t-butyl phenol) and 2,6-di-t-butyl phenol.

It is preferred that the display device of the present invention comprises an antireflection layer. The device comprising the antireflection layer has a higher reflectance in a white state and exhibits a higher contrast compared to a device comprising no antireflection layer. And it is possible to reduce the reflection of interior light, and the antireflection layer may contribute to improving visibility. The antireflection layer may be formed of an inorganic and/or organic composition, and may have a single layer structure or multi-layered structure. And the antireflection layer may have a multi-layered structure, and may comprise an inorganic layer and an organic layer. The antireflection layer is formed on either side or both sides of the display device. Two antireflection layers formed on both sides may be same or different each other. One possible embodiment comprises an antireflection layer, formed on one side, having a multi-layered structure and another antireflection layer, formed on another side, having a single layer structure. And another possible embodiment comprises an antireflection layer formed on a surface of the electrode, and, in particular, comprises a substrate formed of a plastic film or the like, an electrode formed on a surface of the substrate and an antireflection layer formed on a surface of the electrode. Examples of the material for the antireflection layer include inorganic materials such as $SiO_2$, SiO, $ZrO_2$, $TiO_2$, TiO, $Ti_2O_3$, $Ti_2O_5$, $Al_2O_3$, $Ta_2O_5$, $CeO_2$, MgO, $Y_2O_3$, $SnO_2$, $MgF_2$, and $WO_3$; of them or any mixtures thereof may be used. Among of these, using $SiO_2$, $ZrO_2$, $TiO_2$ or $Ta_2O_5$, it is possible to carry out vacuum deposition at a low temperature, and to form an antireflection layer even on a plastic substrate. The antireflection layer having a multi-layered structure may be produced by alternating forming a high refractive index layer such as a $ZrO_2$ layer and forming a low refractive index layer such as $SiO_2$ layer in this order from the substrate side, so that the total optical thickness of the $ZrO_2$ layer and the $SiO_2$ layer disposed in this order from the substrate side becomes λ/4, the optical thickness of the $ZrO_2$ layer becomes λ/4 and the optical thickness of the uppermost $SiO_2$ layer becomes λ/4. it is to be noted that "λ" means a wavelength used for design, and, in general, 520 nm is used. It is preferred that the uppermost layer has a low refractive index and can contribute to improving strength of the antireflection layer, and that the uppermost layer is formed of $SiO_2$. The antireflection layer maybe formed using any inorganic material by a vacuum deposition method, an ion plating method, a sputtering method, a CVD method, a method of depositing a target material in a saturated solution by a chemical reaction or the like. Examples of the organic material include FFP (tetrafluoro-hexafluoro propylene copolymer) and PTFE (poly tetrafluoroethylene) and ETFE(ethylene-tetrafluoroethylene copolymer); and the materials may be selected in view of the materials of the substrate or a hard coat layer (if it is formed). The antireflection layer may be formed using any organic material by a vacuum deposition and a coating method, which is excellent in view of mass productivity, such as a spin coating method and a dip coating method.

For forming a hard coat layer, known ultraviolet curing or electron beam curing acryl based or epoxy based polymers may be used.

For forming an antifouling layer, water- and oil-repellent materials such as fluorine-containing organic polymers can be used.

The position of each of these layers is not to be limited, and may be decided in view of these functions. It is preferred that, for example, the ultraviolet-absorbing layer, the barrier layer, the hard coat layer and the antifouling layer are disposed at the outer side. And the antireflection layer may be formed on a surface of each of the substrates sandwiching each liquid crystal layer therebetween.

The display device of the invention can be driven by a simple matrix drive method, or by an active matrix drive method utilizing for example a thin film transistor (TFT). The simple matrix drive method is preferred in view of a low cost to be required for production of the electrodes, and the active matrix drive method is preferred in view of obtaining a high display quality. Such drive methods are described in detail for example in *Liquid Crystal Device Handbook*, Japan Society for the Promotion of Science, Committee 142, p. 387-460 (1989), Published by Nikkan Kogyo Shimbun), and can be utilized for driving the display device of the invention. Examples of the dual-frequency switching method using a simple matrix drive system include those disclosed in JPA Nos. syo 54-84995, syo 61-16988, and 2002-149130.

The color display device of the present invention may comprise one or more liquid crystal layers containing a plural of dichroic dyes. The color of each liquid crystal is not to be limited.

Next, the configuration of the display device of the invention is described in detail.

FIG. 1 is a schematic sectional drawing showing an example of a display device of the present invention. The display device shown in FIG. 1 has a structure in which a yellow-colored liquid crystal layer 1Y, a magenta-colored liquid crystal layer 1M and a cyan-colored liquid crystal layer 1C are stacked. Each of the liquid crystal layers 1Y, 1M and 1C is sandwiched between a pair of transparent electrode layers, formed of ITO or the like, 2Y and 3Y, 2M and 3M, and 2C and 3C, so that each liquid crystal layer is applied with an electric field individually. And each transparent electrode layer is formed on a substrate 4 which is for example a polymer film. A substrate 4 disposed between. the liquid crystal layers 1Y and 1M is used as a substrate for supporting both of the electrode layers 3Y and 2M, and a substrate 4 disposed between the liquid crystal layers 1M and 1C is used as a substrate for supporting both of the electrode layers 3M and 2C. And a white scattering-reflecting layer is disposed between the electrode 2Y and the substrate 4.

Figure 2:
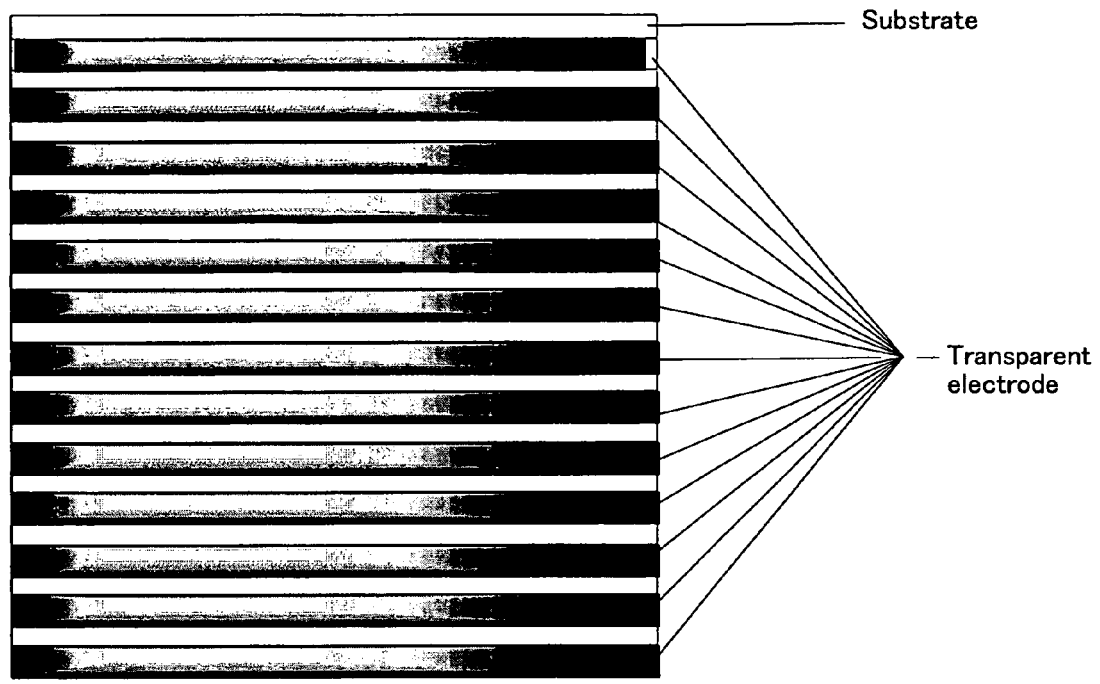
FIG. 2 is a schematic top view showing an example of an electrode which can be employed in the present invention.
Figure 3:
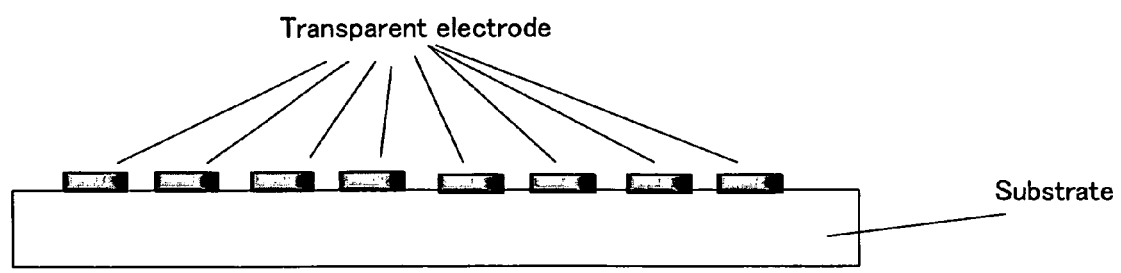
FIG. 3 is a schematic sectional drawing showing an example of an electrode which can be employed in the present invention.

FIG. 2 and FIG. 3 are a schematic top view and a schematic sectional drawing of showing the electrode layer 2Y, 3Y, 2M, 3M, 2C or 3C; As shown in FIGS. 2 and 3, each transparent electrode layer formed on the surface and/or rear face of the substrate is divided into plural stripes by a patterning technique. Such electrode stripes, for example, can be produced by sputtering a transparent conductive material onto a substrate to form a transparent layer, and carrying out patterning the layer using a photolithography technique, an etching technique or the like. Such electrode stripes can also be pattern-printed using a dispersion of a transparent conductive material. Two electrode layers are disposed opposite to each other, so that the stripes of one electrode layer are perpendicular to the stripes of another electrode layer, and a matrix (grid) of horizontal and vertical electrode stripes is formed. And, the device employing such an arrangement of electrodes can be driven according to a passive matrix system.

In FIG. 1, each of the liquid crystal layers 1Y, 1M and 1C is formed of a composition comprising at least one dichroic dye and host liquid crystal showing dual-frequency switchable property. The liquid crystal layer 1Y, 1M or 1C is respectively colored yellow, magenta or cyan by yellow dichroic dye, magenta dichroic dye or cyan dichroic dye respectively contained in the layers, and, therefore, the device shown in FIG. 1 can display full-color images. And the white scattering-reflecting layer 5 may be formed of a composition containing polymer and white pigment dispersed in polymer, and titanium oxide is preferably used as white pigment.

The above mentioned ultraviolet absorbing layer or barrier layer may be disposed on a surface of the uppermost layer, or, in other words, the substrate 4 in FIG. 1, and/or on a surface of the lowest layer, or, in other words, the substrate 4 in FIG. 1. The above mentioned antireflection layer may be formed on surfaces of the substrates sandwiching each of the liquid crystal layers 1Y, 1M and 1C therebetween, and the antireflection layer may be formed on a surface of each electrode layer by using a sputtering technique or the like after the electrode layers 2Y, 3Y, 2M, 3M, 2C and 3C are formed respectively.

Figure 4:
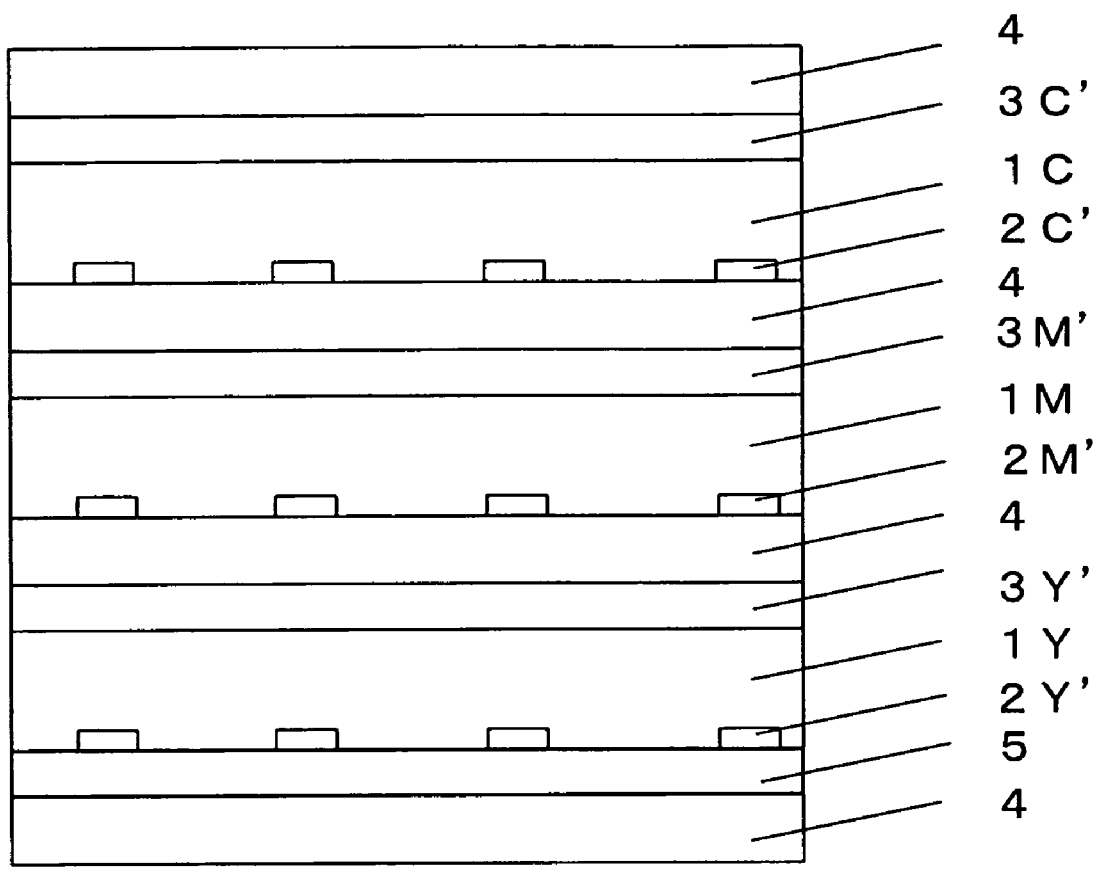
FIG. 4 is a schematic sectional drawing showing another example of a display device of the present invention.

FIG. 4 is a schematic sectional drawing showing another example of a display device of the present invention. The example shown in FIG. 4 is an active-matrix type of display device employing thin film transistors (TFTs). In FIG. 4, the same members as those shown in FIG. 1 are numbered with a same numerical symbol as that in FIG. 1, and the detailed explanations of those are skipped.

The display device shown in FIG. 4 employs substrates having TFT's thereon. More specifically, the device employs pairs of electrodes, one of which is a transparent opposed electrode (3C', 3M' or 3Y') and other one of which is a transparent picture electrode (2C', 2M' or 2Y'). Each picture electrode (2C', 2M' or 2Y') is electrically connected with TFT, in FIG. 4 represented as a set of TFT and picture electrode by 2C', 2M' and 2Y', formed on a surface of each substrate 4, and this configuration allows the display device to be driven by an active-matrix system.

Figure 5:
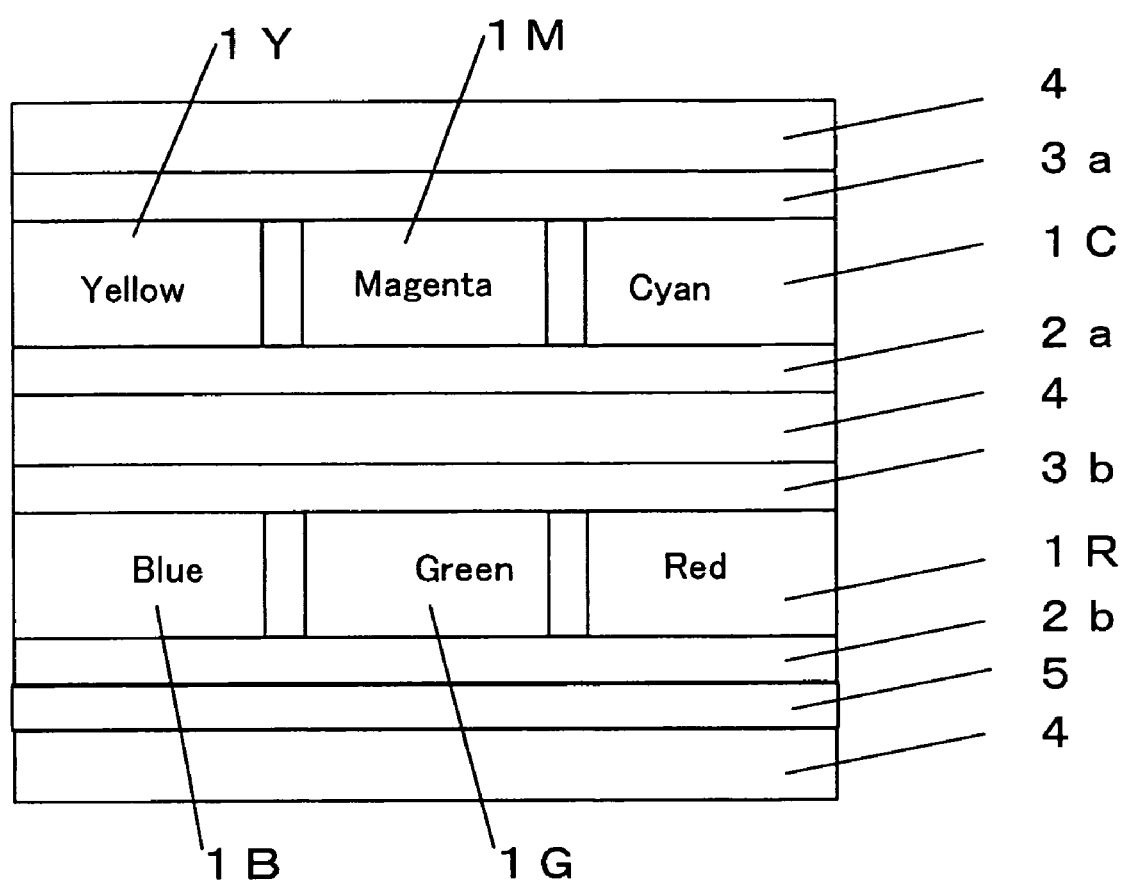
FIG. 5 is a schematic sectional drawing showing another example of a display device of the present invention.

FIG. 5 is a schematic sectional drawing showing another example of a display device of the present invention. The display device shown in FIG. 5 is a two-layered type device comprising a first liquid crystal cell comprising a pair of electrode layer 2a and 3a, and, between the electrode layers, a yellow-colored liquid crystal layer 1Y, a magenta-colored liquid crystal layer 1M and a cyan-colored liquid crystal layer 1C which are disposed in parallel with each other; and a second liquid crystal cell comprising a pair of electrode layer 2b and 3b, and, between the electrode layers, a blue-colored liquid crystal layer 1B, a green-colored liquid crystal layer 1G and a red-colored liquid crystal layer 1R which are disposed in parallel with each other. The liquid crystal layers are arranged so that the colors of the upside and downside layers are complementary to each other, and this configuration gives a full-color type display device.

The display device of the present invention can be used not only as a general image display apparatus but also as a rewritable display media such as a reward card or a media displaying textual or image information temporarily.

EXAMPLES

Paragraphs below will more specifically explain the present invention referring to Examples and Comparative Examples, wherein the present invention is by no means limited to these Examples. Evaluation of the lubricant composition in Examples and Comparative Examples was carried out according to the methods below.

Example No. 1

<Preparation of a Display Device>

1. Preparation of Dichroic Dyes and Liquid Crystals

Dichroic dye Nos. 1-2 and 1-8 were prepared according to the method described in JPA No. 2003-192664 (the columns from [0070] to [0078]). Dichroic dye No. 1-12 was prepared according to the method described in JPA No. 2005-272713. Dichroic dye No. 1-14 was prepared according to the method described in JPA No. 2005-120334. A commercially available nematic liquid crystal (1) shown below, having a dual-frequency switchable property, manufactured by Sigma-Aldrich, Inc., was uses as host liquid crystal. And a commercially available chiral agent, "R-811" manufactured by Sigma-Aldrich, Inc. was used. Nematic liquid crystal (1)

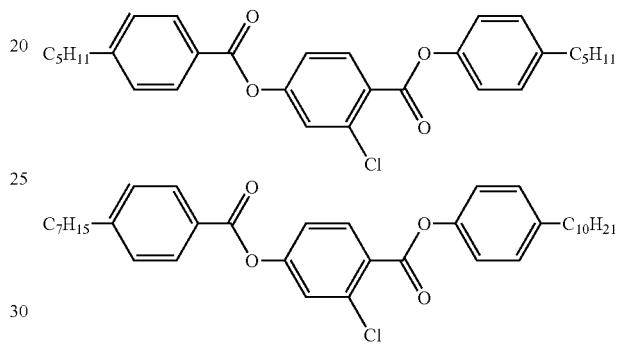

2. Production of a Liquid Crystal Display Device

Each dichroic dye shown in Table 1 and a chiral agent, "R-811", (1.2 wt %) were dissolved in 1.0 g of Nematic liquid crystal (1) under heating, and left for a day at a room temperature. And, thus, each liquid crystal composition was prepared. The amount of dichroic dye in each composition was decided so that the absorbance of an 8 μm-thickness sample cell filled with the composition is 0.8.

A liquid crystal device having a same configuration shown in FIG. 1 was produced by using the obtained three kinds of liquid crystal compositions. More specifically, the device was produced as follows:

Two glass plates respectively having stripe-shaped ITO electrodes (the width of each stripe is 200 μm, the distance between two stripes is 20 μm and the number of the stripes is 36) thereon, and the obtained liquid crystal composition was applied to a surface (a surface having the ITO layer thereon) of one of the glass plates (first glass plate), to form a liquid crystal layer. And, then, another glass plate (second glass plate) was disposed at a distance from the first glass substrate by placing 8 μm spacers, manufacture by SEKISUI CHEMICAL CO., LTD. The second glass plate was disposed so that the surface having the ITO layer thereon is disposed inside and the ITO stripes were perpendicular to those of the first glass plate. In this way, the liquid crystal layer was sandwiched between the first and second glass plates, to give a liquid crystal cell. Then, the cell was sealed with a photo-curing sealing agent, manufactured by SEKISUI CHEMICAL CO., LTD. The sequence of these procedures was carried out three times, and three liquid crystal layers, each of which is sandwiched between a pair of ITO electrode layers, were stacked.

A coating fluid was prepared by dispersing white pigment, titanium oxide surface surface-inactivated by surface treating, with 5 wt % of carboxycellulose. A white scattering layer was formed by applying the coating fluid to a surface of the lowest substrate.

TABLE 1

| | Dichroic dye No. | Note |
|---|---|---|
| Upper Layer | 1-8 | Magenta Dye |
| Inter Layer | 1-13 | Cyan dye |
| Lower Layer | 1-2 | Yellow Dye |

3. Evaluation

The obtained display device, one example of the present invention, was applied with signal waveform, as shown in FIG. 4 of JPA NO. syo 54-84995 by a LCD driving apparatus, "MODEL9401" manufacture by SUN WATER CO., LTD., and it was confirmed that the device could display high-contrast full-color images in which the selected pixels were in black state and the non-selected pixels were in white state. And it was also confirmed that the device gave an eye-pleasing white background having no dependency on viewing angle, based on scattering. And, thus, it is understandable that the device could images without a polarizing plate, gave a white state based on scattering as well as a paper, and had a high level of visibility.

And it was also confirmed by measuring response time with "MCPD3000" manufactured by Otsuka Electronics Co., Ltd. that the response time of the device was less than 20 ms.

Example No. 2

1. Preparation of a Substrate

A plastic (PEN) substrate was produced in the same manner as Sample 110 of Example No. 1 described in JPA No. 2000-105445. More specifically, a PEN substrate was produced as follows:

A mixture of 100 weight parts of polyethylene-2,6-naphthalate polymer and two weight parts of "Tinuvin P.326" manufactured by Ciba-Geigy as a ultraviolet-absorbing agent was prepared, dried, and, then, melted at 300° C. And the melted fluid was extruded from a T type die, to form a film, and the film was stretched as long as 3.3-fold in a lengthwise direction at 140° C., stretched as long as 3.3-fold in a lateral direction at 130° C., and was subject to thermal fixing at 250° C. for six seconds, to give a plastic (PEN) substrate having a thickness of 90 µm. An undercoating layer and a back layer were formed on a surface of the obtained plastic substrate.

2. Preparation of a Transparent Electrode Layer

Coating one surface of the obtained plastic substrate with conductive layer of indium tin oxide, a uniform ITO layer having a thickness of 200 nm was formed. The ITO layer had a plane resistance of 20 Ω/cm² and a light transmittance at 500 nm of 85%. And, the ITO layer was patterned by photolithography to form a transparent electrode layer consisting of plural stripes (the width of each stripe was 100 µm and the distance of two stripes was 10 µm).

3. Production of a Display Device

A display device having a configuration shown in FIG. 1 was produced in the same manner as Example No. 1, except that the dichroic dyes shown in Table 2 were used for producing three liquid crystal layers.

A coating fluid was prepared by dispersing white pigment, titanium oxide surface surface-inactivated by surface treating, with 5 wt % of carboxycellulose. A white scattering layer was formed by applying the coating fluid to a surface of the lowest substrate.

TABLE 2

| | Dichroic dye No. | Note |
|---|---|---|
| Upper Layer | 1-8 | Magenta Dye |
| Inter Layer | 1-2 | Cyan dye |
| Lower Layer | 1-14 | Yellow Dye |

4. Evaluation of Display Ability

The obtained display device was evaluated in the same manner as Example No. 1, and it was confirmed that the device could display high-contrast full-color images.

Example No. 3

1. Preparation of a Plastic Substrate

A PEN (Dupont-Teijin $Q^{65}A$) substrate was produced in the same manner as Sample 110 of Example No. 1 described in JPA No. 2000-105445. More specifically, a PEN substrate was produced as follows:

A mixture of 100 weight parts of polyethylene-2,6-naphthalate polymer and two weight parts of "Tinuvin P.326" manufactured by Ciba-Geigy as a ultraviolet-absorbing agent was prepared, dried, and, then, melted at 300° C. And the melted fluid was extruded from a T type die, to form a film, and the film was stretched as long as 3.3-fold in a lengthwise direction at 140° C., stretched as long as 3.3-fold in a lateral direction at 130° C., and was subject to thermal fixing at 250° C. for six seconds, to give a plastic (PEN) substrate having a thickness of 90 µm. An undercoating layer and a back layer were formed on a surface of the obtained plastic substrate.

2. Preparation of a Transparent Electrode Layer

Coating one surface of the obtained plastic substrate with conductive layer of indium tin oxide, a uniform ITO layer having a thickness of 200 nm was formed. The ITO layer had a plane resistance of 20 Ω/cm² and a light transmittance at 500 nm of 85%. And, a thin film of $SiO_2$ (100 nm) was formed on a surface of the ITO layer as an antireflection layer according to a sputtering method. The photo transmittance at 500 nm was 90%.

3. Production of a Display Device

A display device was produced in the same manner as Example No. 1, except that the plastic substrates having the antireflection layer on the ITO electrode layer were used. The obtained device had a same configuration as that shown in FIG. 1, except that each liquid crystal layer (in FIG. 1, 1Y, 1M or 1C) was sandwiched between the electrode layers having an antireflection layer of $SiO_2$ disposed on the inside surface thereof.

4. Preparation of a Barrier Layer

In a mixed solvent of 118.8 g of 1-propanol and 73.2 g of water, 8 g of ethylene-vinyl alcohol ("Soarnol D2908" manufactured by Nippon Synthetic Chemical Industry Co., Ltd.) was dissolved at 80° C. After being added and mixed with 2.4 ml of 2N hydrochloric acid, 10.72 g of the obtained solution was added dropwise with 1 g of tetraethoxysilane under stirring, and stirred for 30 minutes, to give a coating fluid. The obtained coating fluid was applied to a surface of the display device, or, in other words, a surface of the uppermost substrate 4 in FIG. 1, with a wire bar. After that, dried at 120° C. for 5 minutes, an organic-inorganic hybrid layer (a barrier layer), having a thickness of about 1 μm, was formed.

5. Preparation of a Ultraviolet-Absorbing Layer

A coating fluid for a ultraviolet-absorbing layer was prepared by mixing 42 g of water, 40 g of silanol-modified polyvinyl alcohol (trade name "R$^{2105}$" manufacture by Kuraray Co., Ltd., and 13.5 g of capsule solution for a ultraviolet-absorbing layer, and, then, adding 17 g of 50% solution of 2-(3-t-butyl-5-methyl-2-hydroxyphenyl)-5-chlorobenze triazole, 65 g of 20% colloidal silica dispersion liquid (trade name "SNOWTEXO" manufacture by NISSAN CHEMICAL INDUSTRIES, LTD.), 2.5 g of polyoxyethylene alkyl ether phosphate ("NEOSCORE CM57" manufactured by TOHO Chemical Industry Co., LTD) and 2.5 g of polyethylene glycol dodecyl ether ("EMULGEN 109P" manufactured by KAO CORPORATION.

The obtained coating fluid was applied a surface of the barrier layer with a wire bar. And, then, dried at 120° C. for 5 minutes, a ultraviolet-absorbing layer having a thickness of 1 μm was formed.

A coating fluid was prepared by dispersing white pigment, titanium oxide surface surface-inactivated by surface treating, with 5 wt % of carboxycellulose. A white reflecting layer was formed by applying the coating fluid to a surface of the lowest substrate (in FIG. 1 substrate 4).

6. Evaluation of Displaying Ability

The obtained display device was evaluated in the same manner as Example No. 1, and it was confirmed that the device could gives a reflectance of 50% in a white state and a contrast ration of 10. Evaluating response time of the device, it was also confirmed that that the response times in a color development process and in a color fading process are both not longer than 20 ms. And the decrease of displaying ability of the device was not observed visually after irradiated by UV light froma Xe-lamp of 10000 lx. for 100 hours, and it is understandable that the device showed high durability against light.

INDUSTRIAL APPLICABILITY

According to the present invention, it is possible to provide a display device, employing a simple configuration, excellent in color displaying performance, such as a visibility, display contrast and color reproductivity, with a low cost.

The invention claimed is:

1. A display device comprising a plurality of liquid crystal layers disposed between a pair of electrodes respectively, wherein each of the liquid crystal layers shows an absorption peak at a different wavelength and comprises at least one dichroic dye and at least one dual-frequency switchable liquid crystal as a host liquid crystal, wherein said dichroic dye comprises a chromophoric group having a substituent represented by formula (1):

$-(Het)_j\{(B^1)_p-(Q^1)_q-(B^2)_r\}_n-C^1$  formula (1)

in which Het represents an oxygen atom or a sulfur atom; $B^1$ and $B^2$ respectively represent a substituted or non-substituted arylene group, heteroarylene group, or divalent cyclic aliphatic hydrocarbon group; $Q^1$ represents a divalent linking group; $C^1$ represents a substituted or non-substituted alkyl group, cycloalkyl group, alkoxy group, alkoxycarbonyl group, acyl group, or acyloxy group; j represents 0 or p, q, and r respectively represent an integer from 0 to 5; and n represents an integer from 1 to 3, provided that a total number of groups represented by $B^1$ and $B^2$ in formula (1) is from 3 to 10; when any of p, q, and r is equal to or larger than 2, $B^1$, $Q^1$, or $B^2$ present in two or more units may be the same as or different from each other; and when n is equal to or larger than 2, $\{(B^1)_p-(Q^1)_q-(B^2)_r\}$ present in two or more units may be the same as or different from each other.

2. The display device of claim 1, wherein the dual-frequency switchable liquid crystal is nematic liquid crystal.

3. The display device of claim 1, wherein the plural of the liquid crystal layers comprises a yellow-colored liquid crystal layer, a cyan- colored liquid crystal layer, and a magenta-colored liquid crystal layer.

4. The display device of claim 1, wherein the pair of electrodes is constructed to be a simple matrix drive system.

5. The display device of claim 1, wherein the dichroic dye is selected from the group represented by a formula (2):

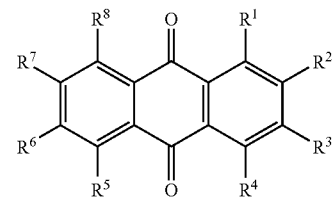

where $R^1$ represents a substituent represented by $-S-\{(B^1)_p-(Q^1)_q(B^2)_r\}_n-C^1$, in which S represents a sulfur atom, and $B^1$, $B^2$, $Q^1$, p, q, r and n have respectively same definitions as in the formula (1) in claim 1; and $R^2$, $R^3$, $R^4$, $R^5$, $R^6$, $R^7$ and $R^8$ respectively represent a hydrogen atom or a substituent.

6. The display device of claim 1, wherein the diebroic dye is selected from the group represented by a formula (3):

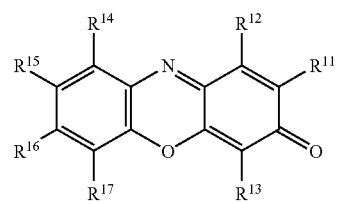

where $R^{11}$, $R^{12}$, $R^{13}$, $R^{14}$, $R^{15}$, $R^{16}$, and $R^{17}$ respectively represent a hydrogen atom or a substituent, provided that at least one represents a substituent represented by $-S-\{(B^1)_p-(Q^1)_q-(B^2)_r\}_n-C^1$, in which S represents a sulfur atom, and $B^1$, $B^2$, $Q^1$, p, q, r and n have respectively same definitions as in formula (1) in claim 1.

7. The display device of claim 1, further comprising a pair of plastic substrates supporting the pair of electrodes respectively.

8. The display device of claim 1, further comprising at least one antireflection film.

9. The display device of claim 8, further comprising a substrate supporting the antireflection film.

10. The display device of claim 1, wherein the antireflection film is disposed on a surface of either of the pair of electrodes.

11. The display device of claim 1, wherein the antireflection film is an inorganic thin film, organic thin film or a combination of an inorganic thin film and an organic thin film.

12. The display device of claim 1, further comprising a barrier layer.

13. The display device of claim 1, further comprising a ultraviolet-absorbing layer.

14. The display device of claim 1, wherein the chromophoric group is selected from the group consisting of azo dye residues, anthraquinone dye residues, perylene dye residues, merocyanine dye residues, azomethyne dye residues, phtaloperylene dye residues, indigo dye residues, azulene dye residues, dioxazine dye residues, polythiophene dye residues, and phenoxazine dye residues.

15. The display device of claim 1, wherein the chromophoric group is selected from the group consisting of azo dye residues, anthraquinone dye residues, and phenoxazine dye residues.

* * * * *